Figure 1:
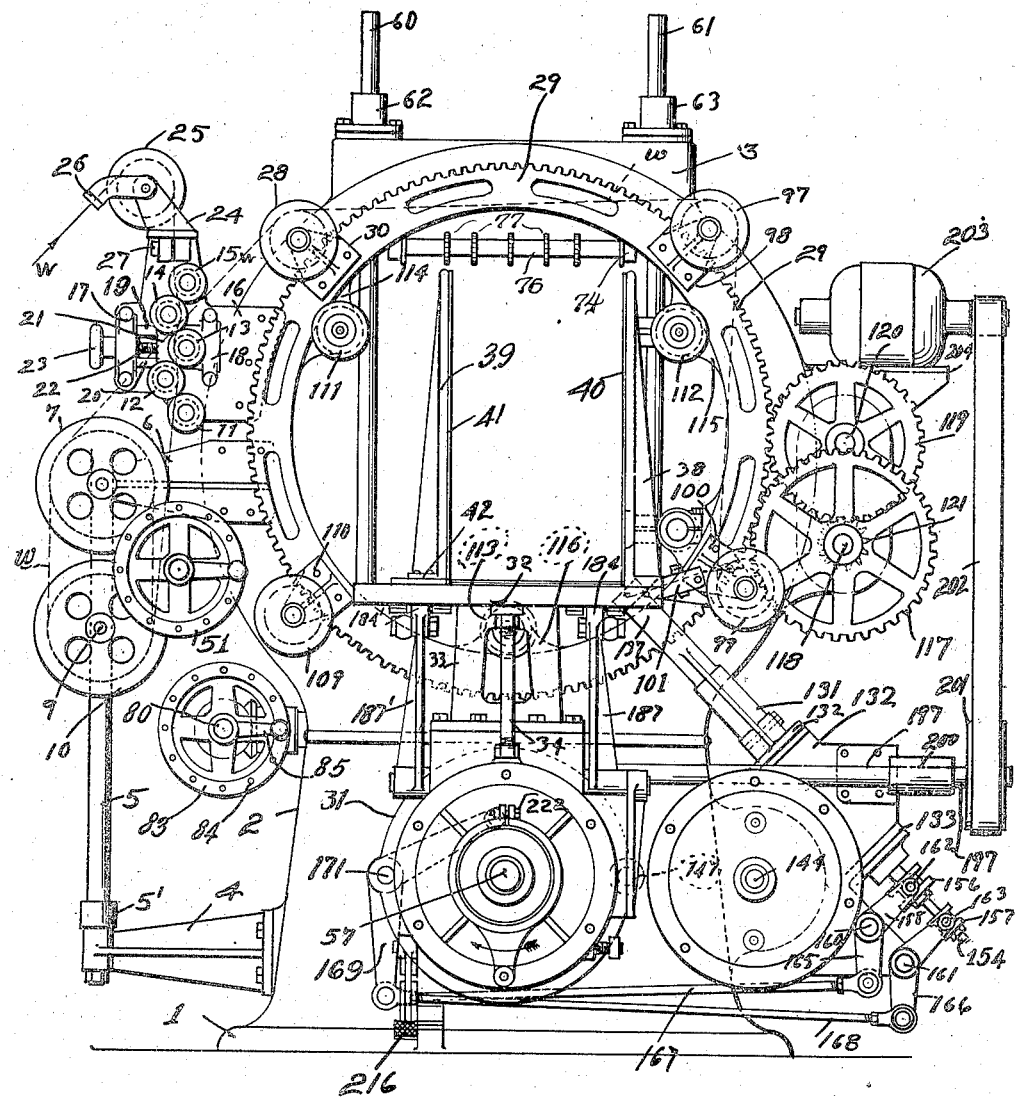

July 2, 1940.  G. A. DUNN ET AL  2,206,299
BUNDLE OR BOX TYING MACHINE
Filed July 6, 1922   15 Sheets-Sheet 1

INVENTORS
Guy A. Dunn
John Eldridge
BY
Carlos P. Griffin
ATTORNEY

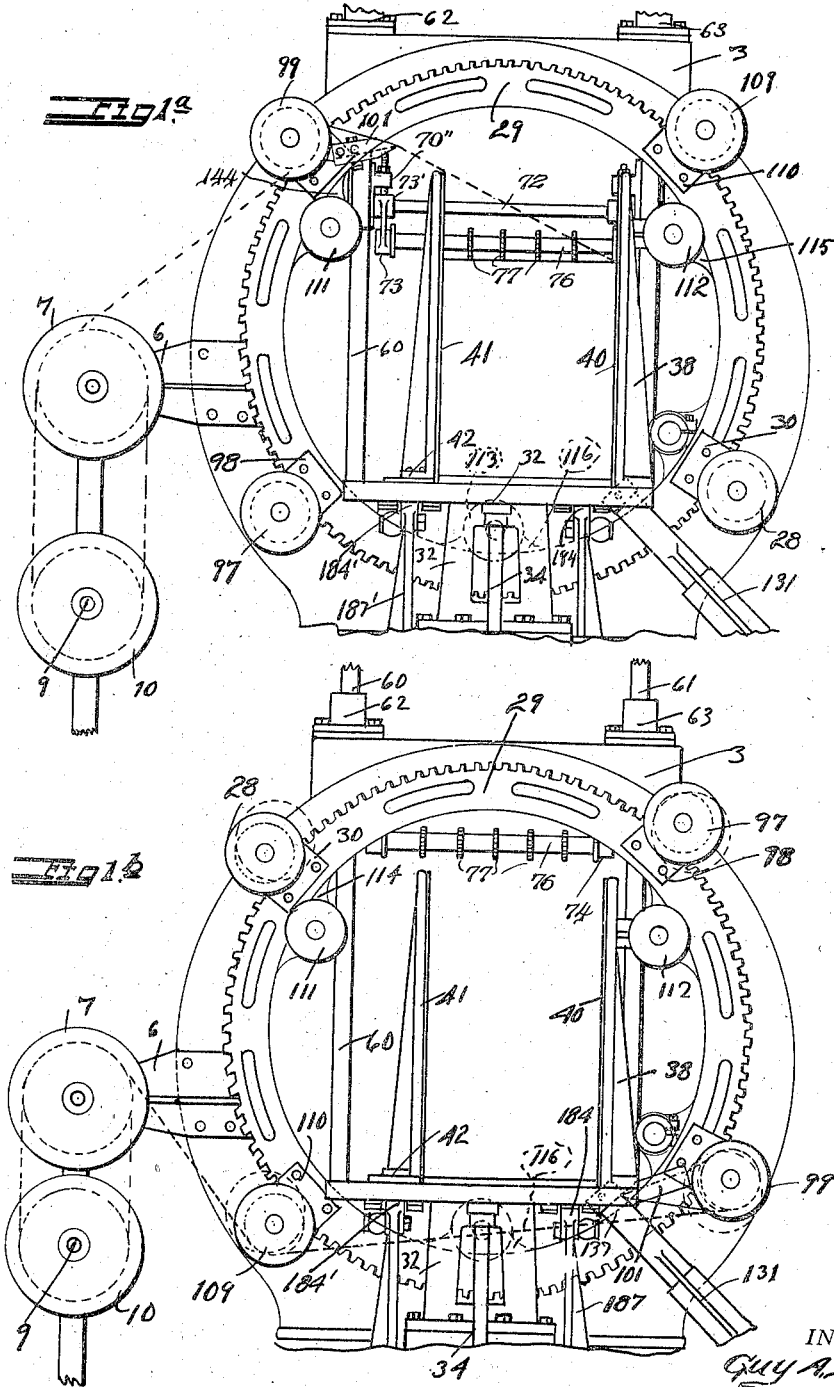

July 2, 1940.  G. A. DUNN ET AL  2,206,299
BUNDLE OR BOX TYING MACHINE
Filed July 6, 1922  15 Sheets-Sheet 3

Fig. 2.

INVENTORS
Guy A. Dunn.
John Eldridge
BY
Carlos P. Griffin
ATTORNEY

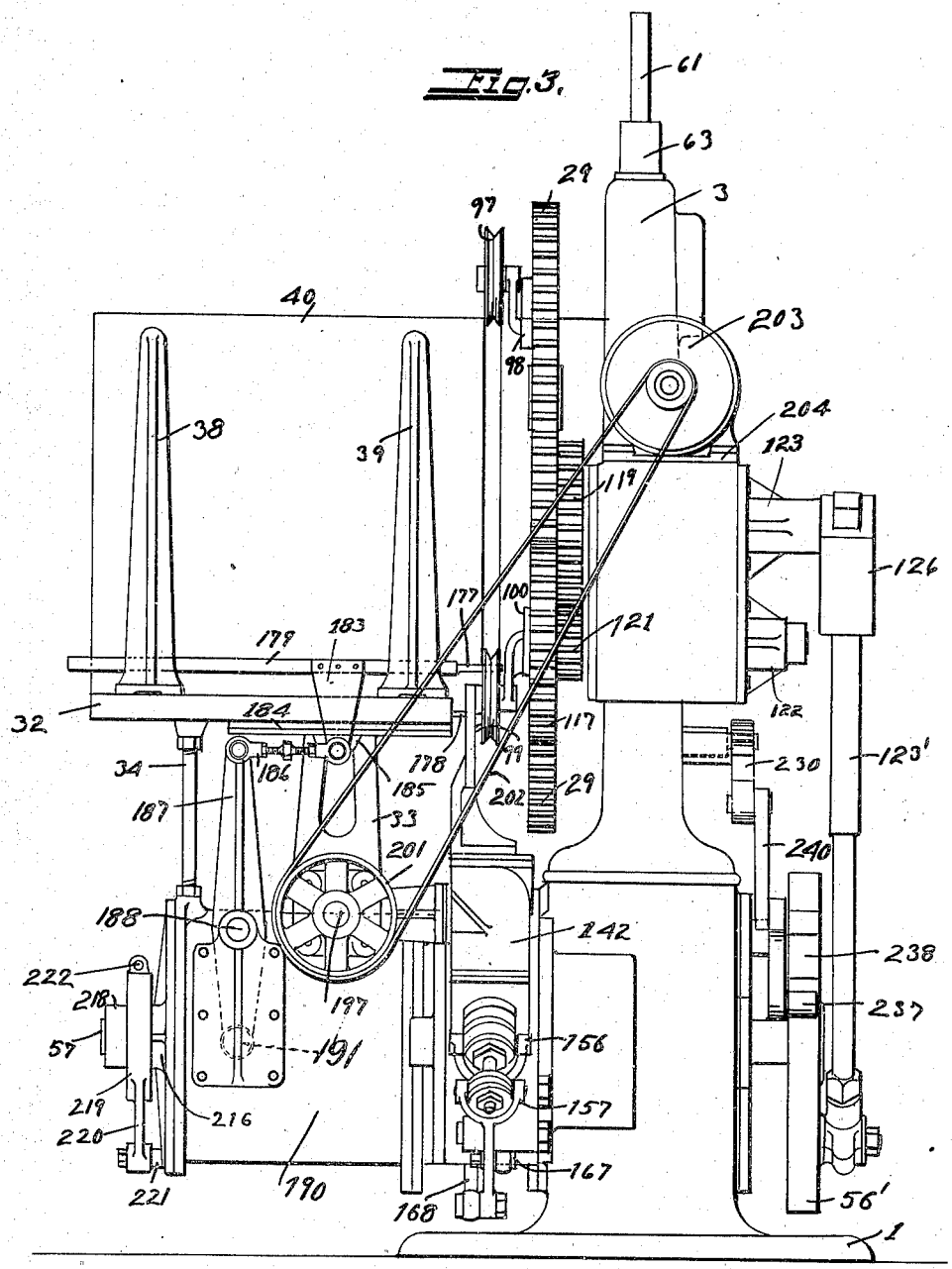

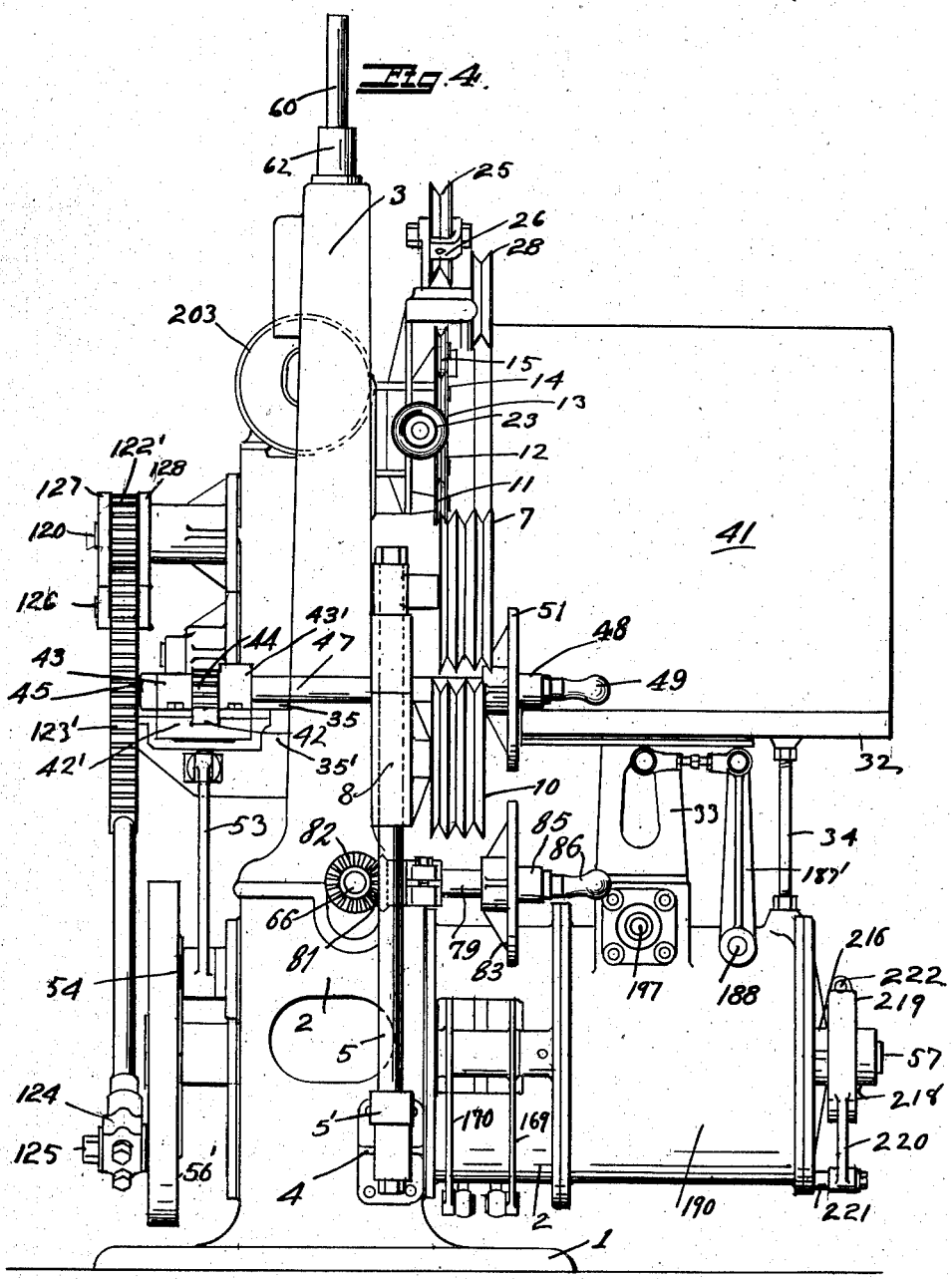

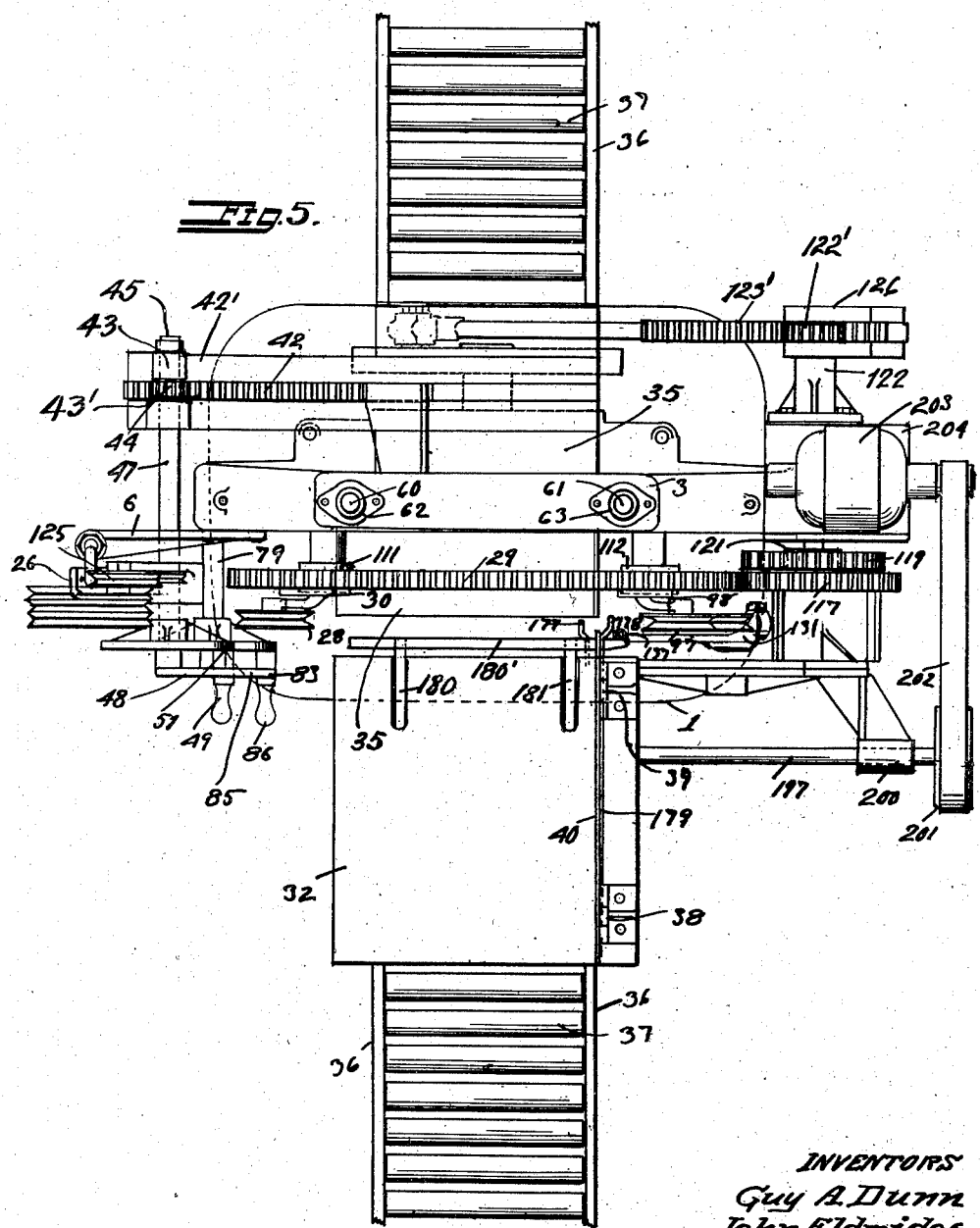

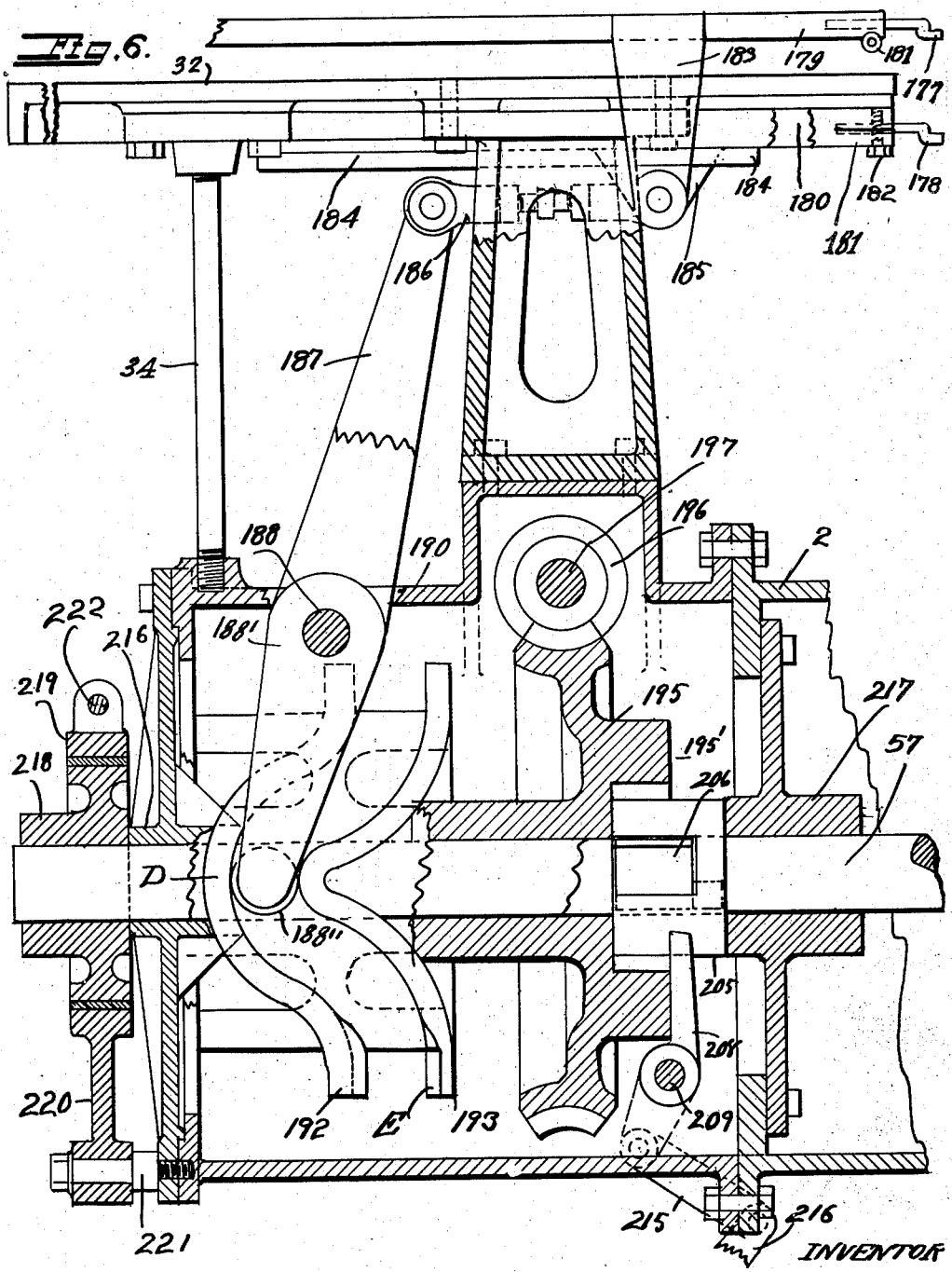

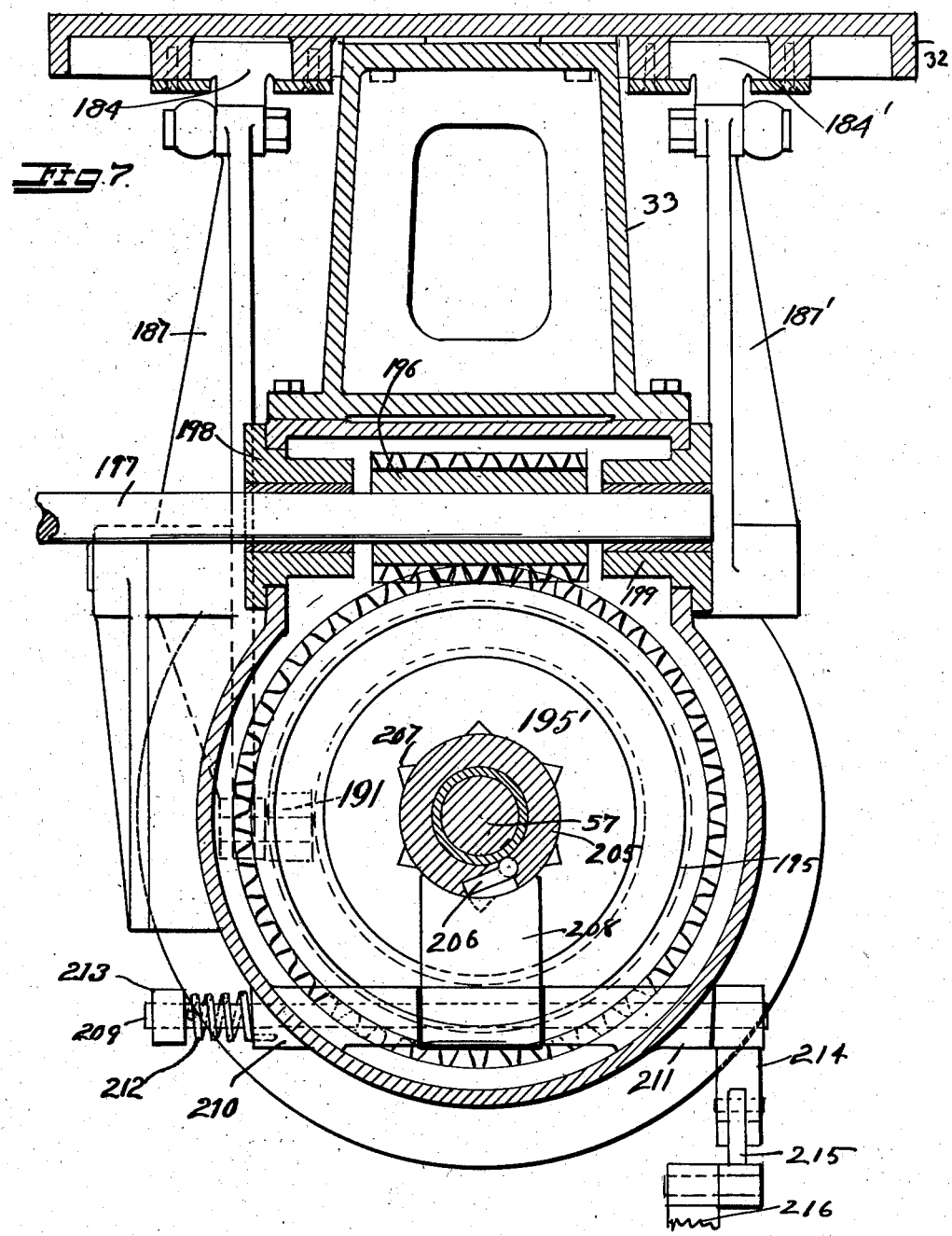

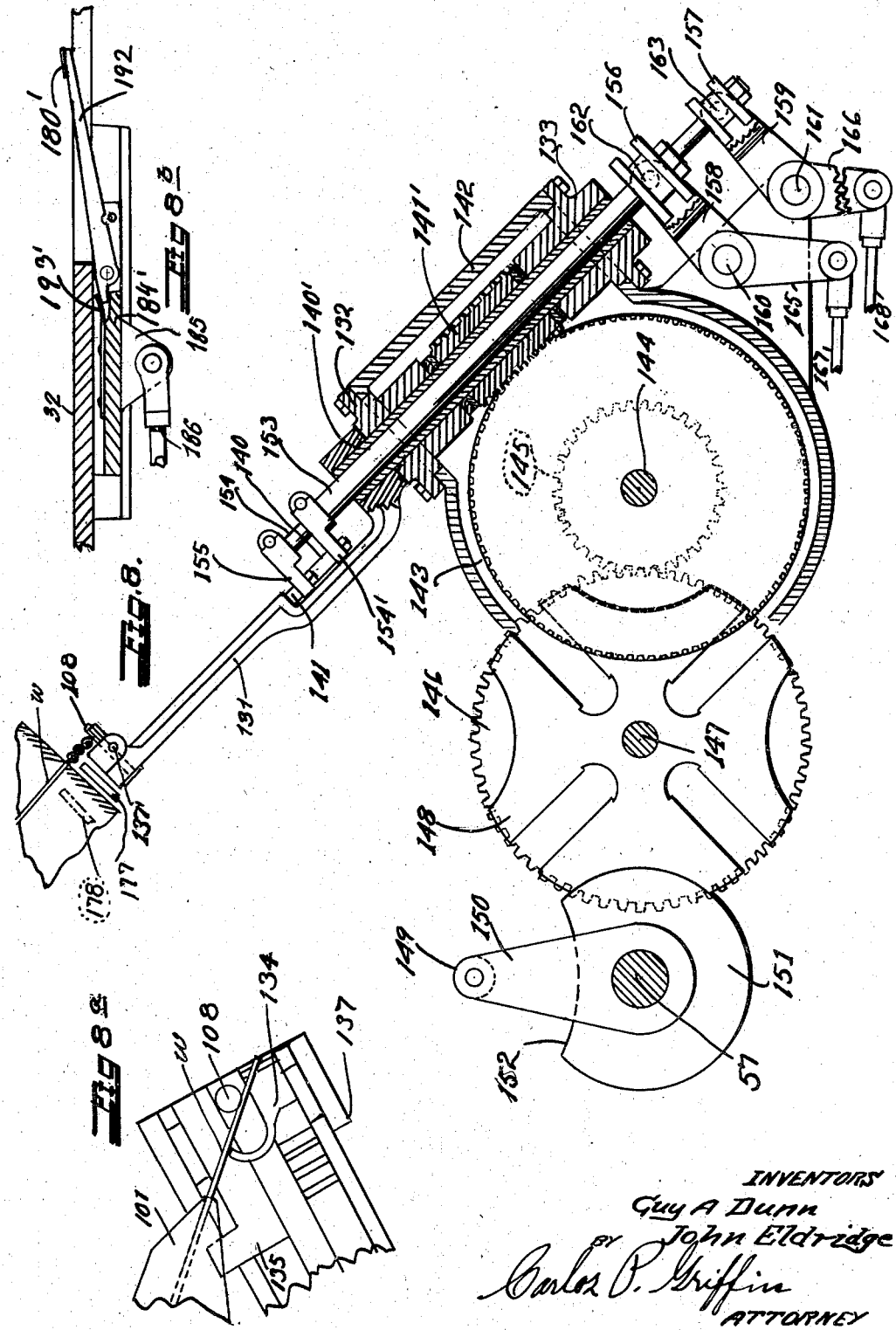

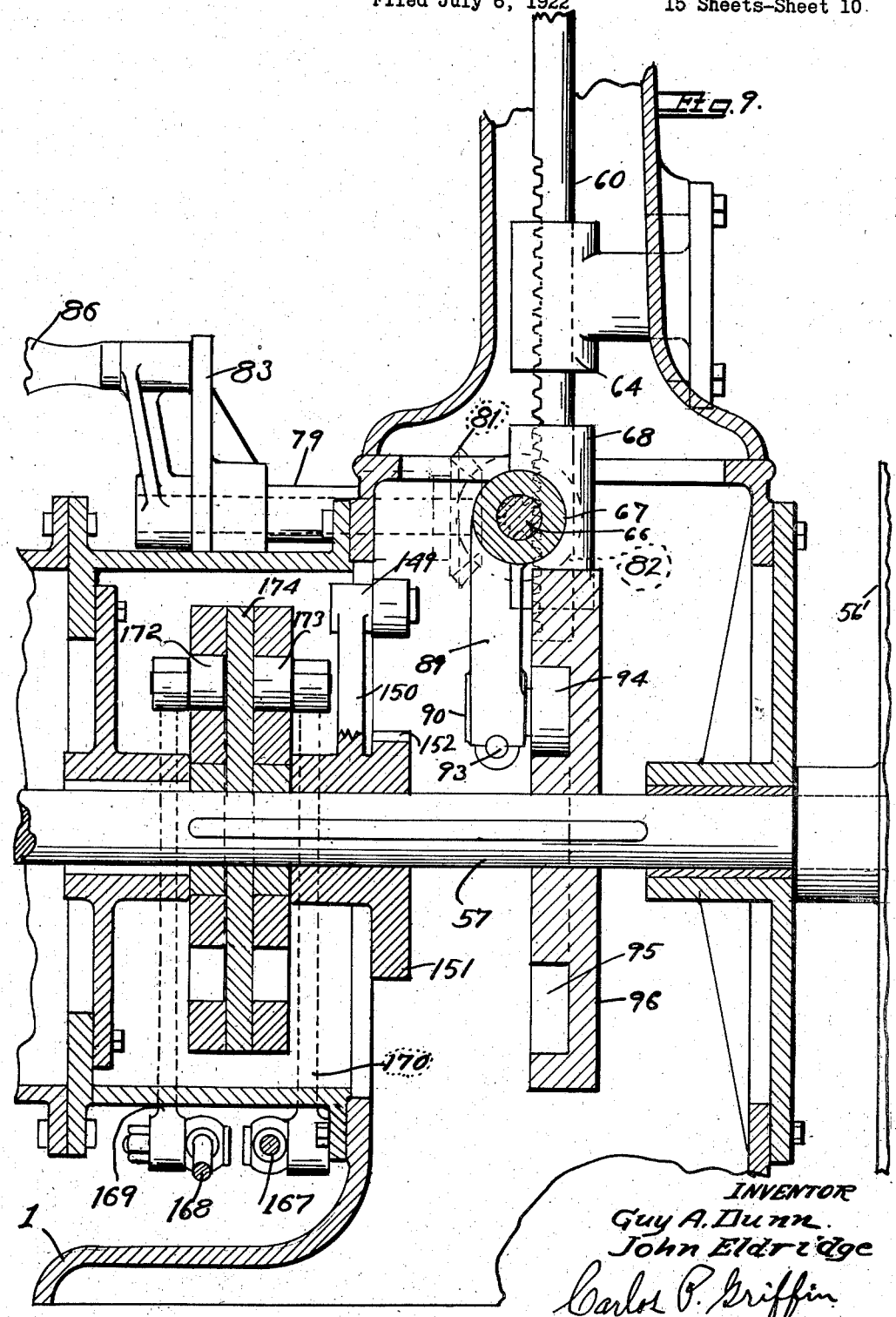

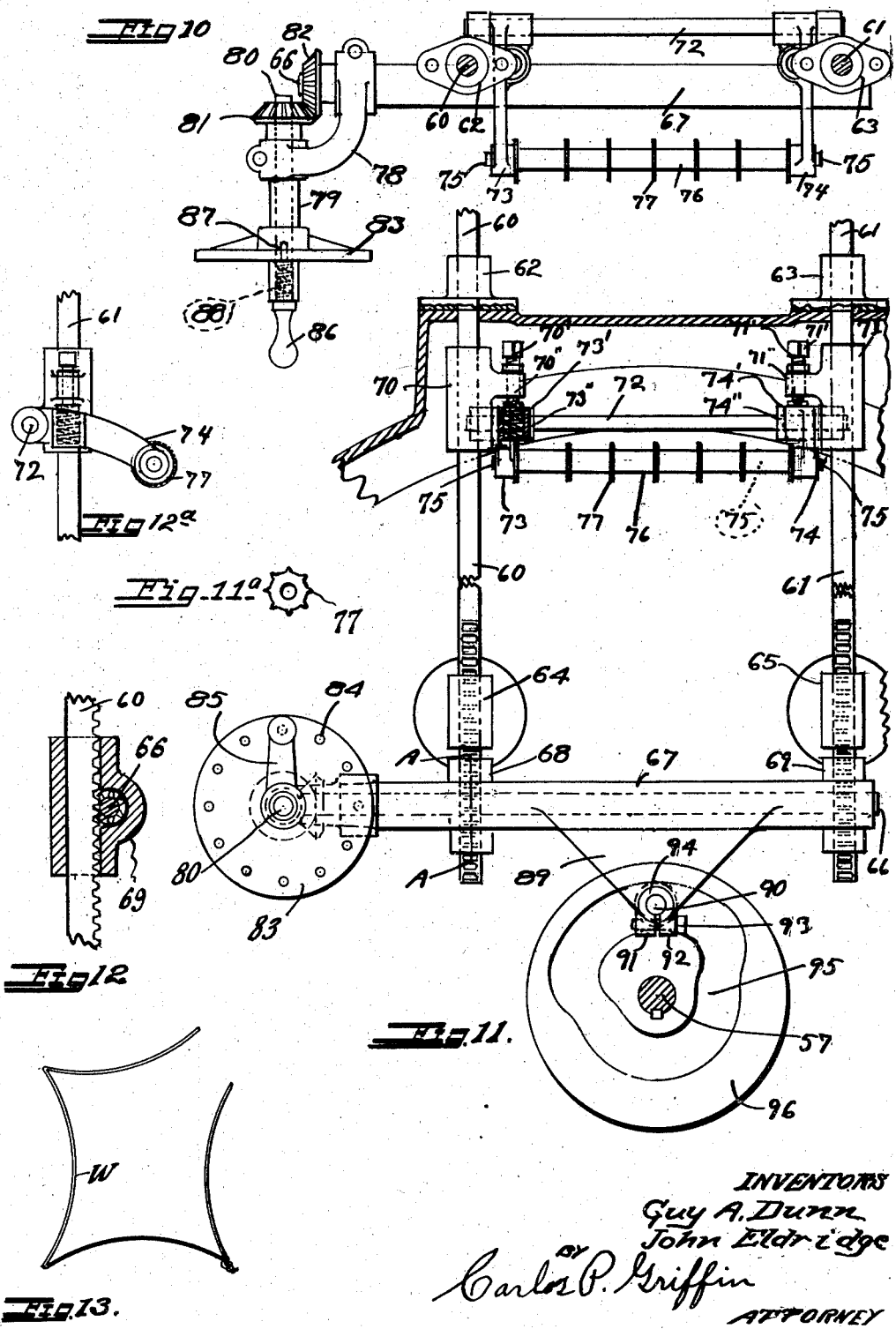

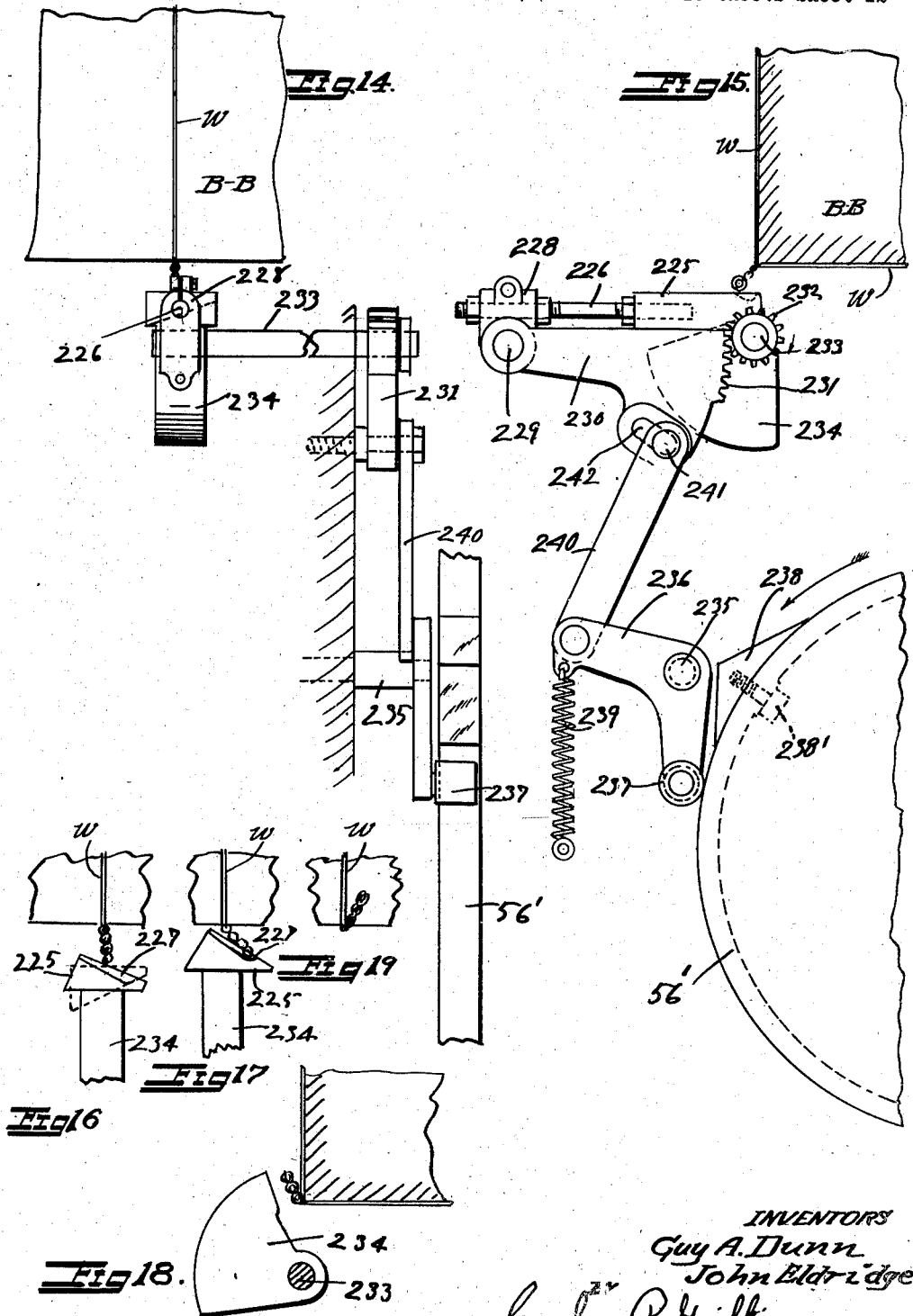

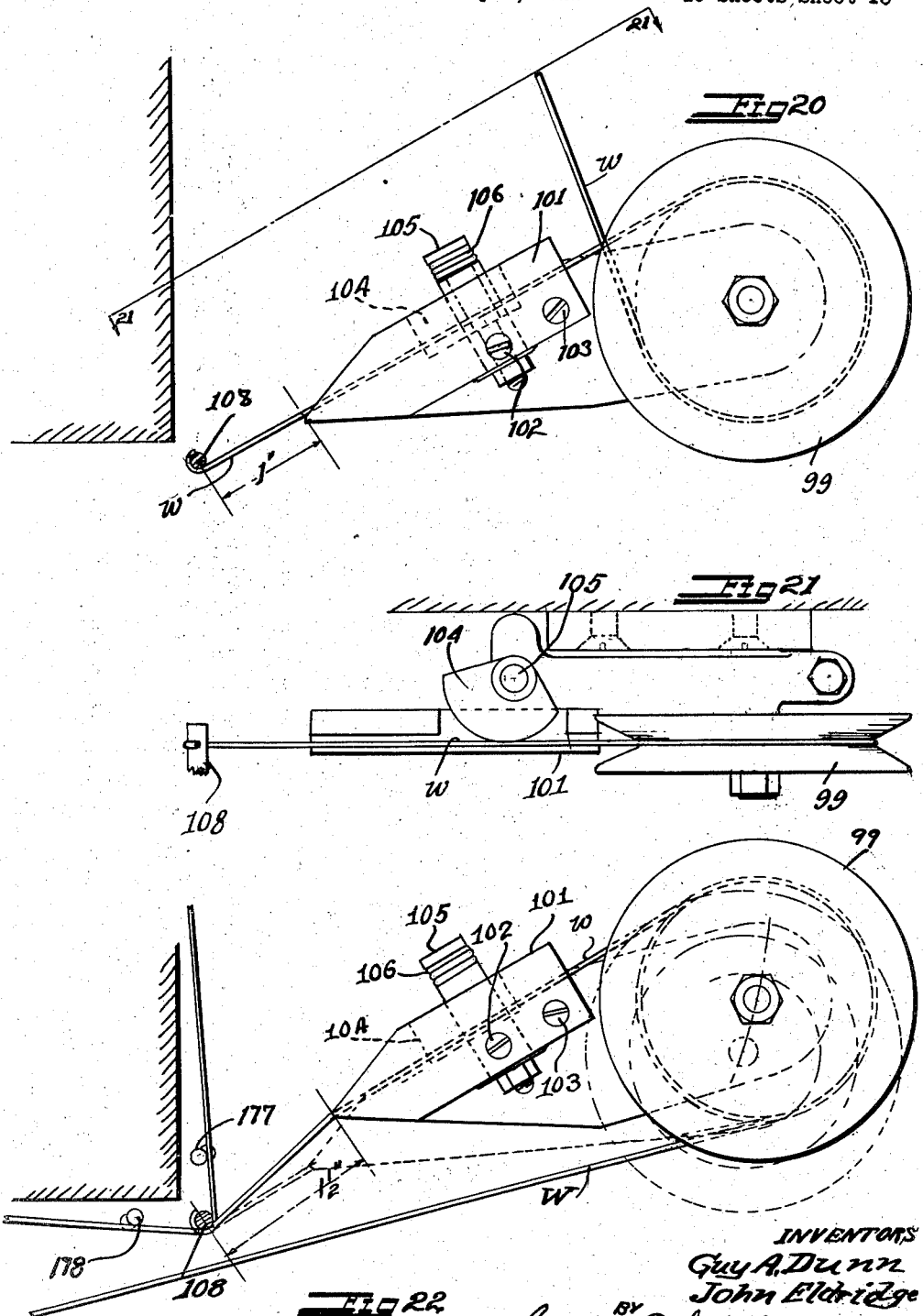

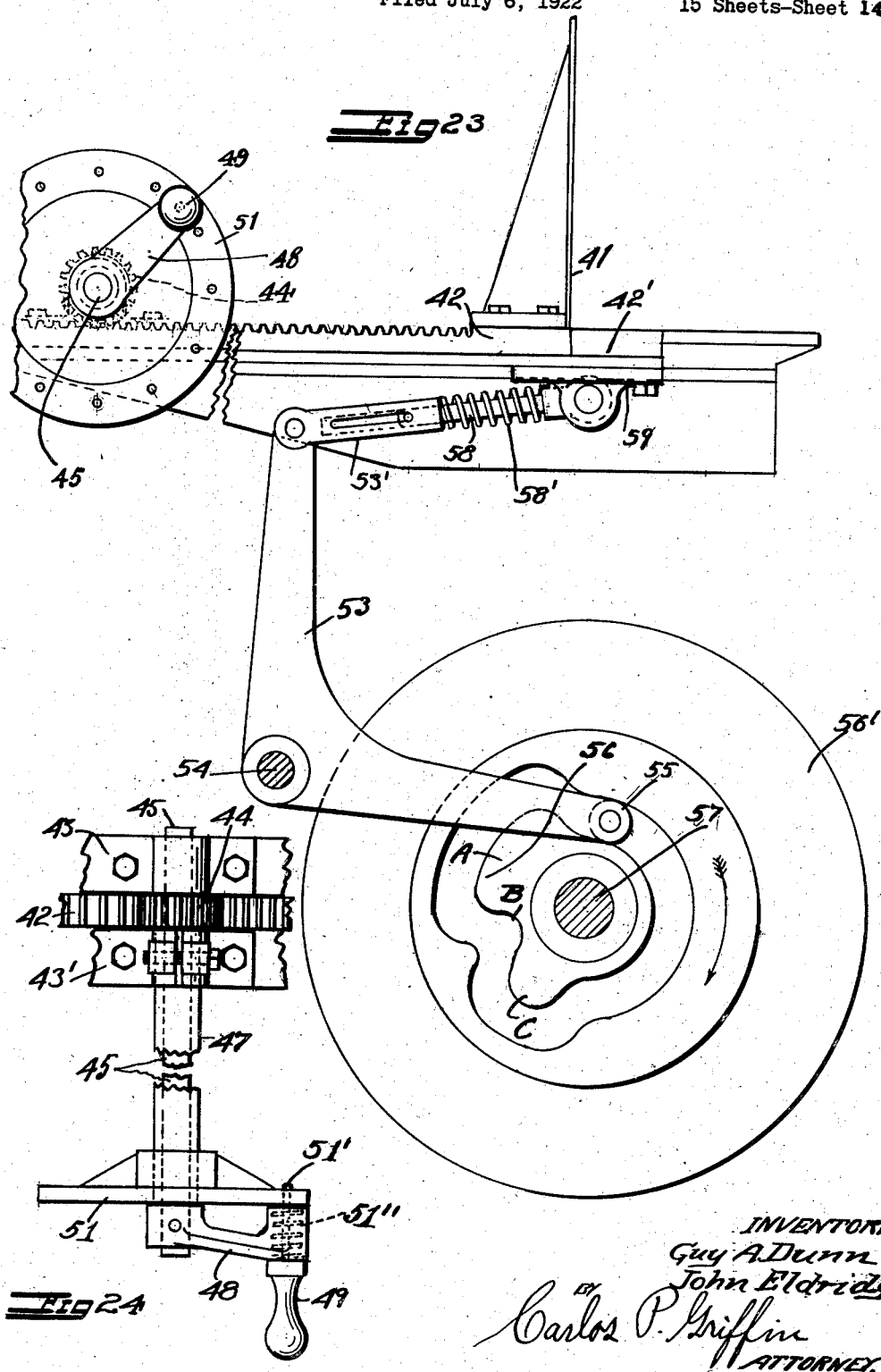

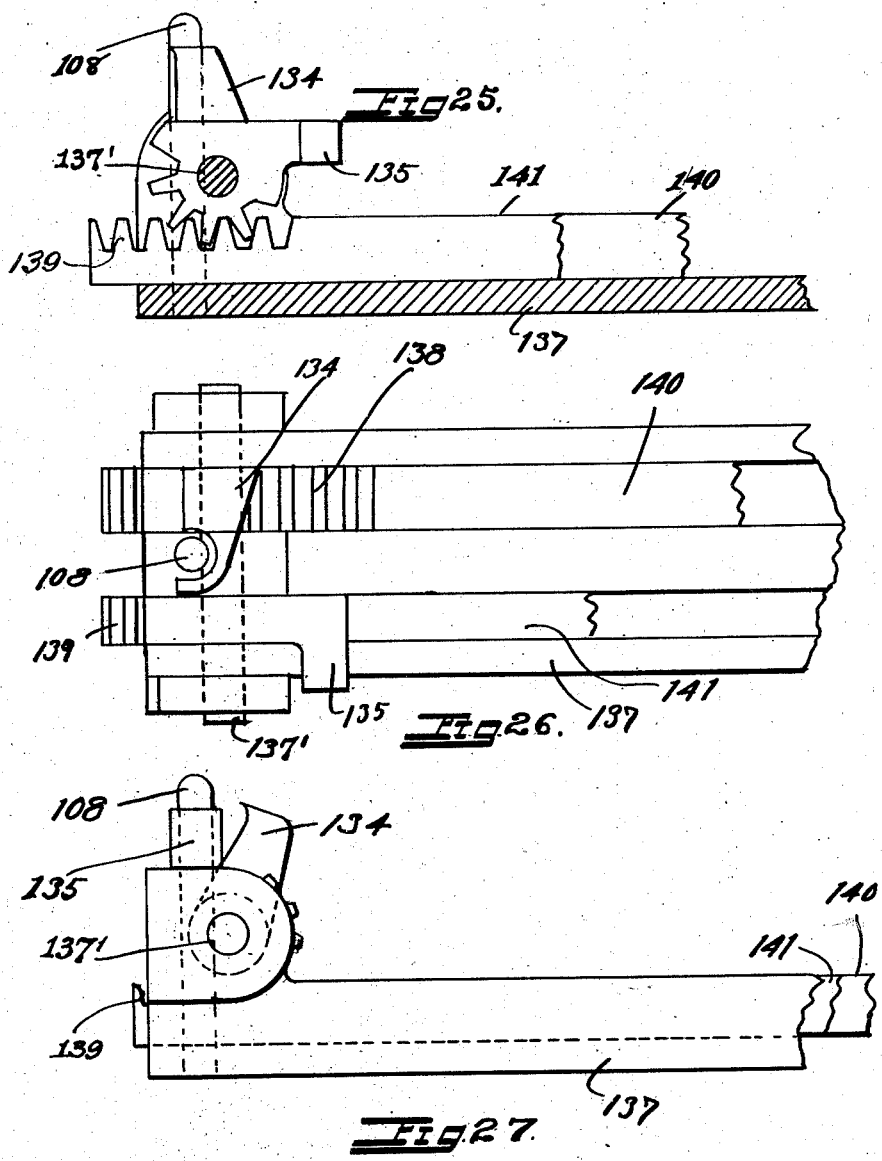

Patented July 2, 1940

2,206,299

UNITED STATES PATENT OFFICE 2,206,299

BUNDLE OR BOX TYING MACHINE

Guy A. Dunn and John Eldridge, Oakland, Calif., assignors, by mesne assignments, to Francis A. Smart, Berkeley, Calif.

Application July 6, 1922, Serial No. 573,205

94 Claims. (Cl. 100—31)

This invention relates to a bundle or box tying machine. Its object is to provide a machine which is capable of wrapping a wire around an incompressible bundle and fastening the ends of the wire together without danger of breaking the wire, and which is also capable of being used on compressible bundles as well.

It will be understood by those skilled in the art of bundle-tying machines that to secure a wire around an incompressible object it is very difficult to prevent the wire from being twisted off during the tying operations. To avoid this disadvantage, this machine has special apparatus to hold the wire loose enough on the bundle, during the wrapping of the binding wire, to provide a sufficient quantity of wire to enable the tie to be made without danger of injury to the wire.

Another object of the invention is to provide a machine which will hold the wire in a given position after the wire has been passed around the bundle, and to thereupon twist the ends of the wire together, beginning at a point distant from the bundle and approaching the bundle, the twist ceasing as soon as it has reached the bundle, thereby reducing the danger of twisting the end of the wire off and breaking the tie.

Another object of the invention is to provide a machine capable of wrapping a wire around a bundle or box, which will cause the wire to lie perfectly flat upon the box, means being provided on the machine for curving the wire in such a direction that when a tie is cut open it will normally spring into curves convex toward the box, thereby causing the wire to lie perfectly flat when drawn against the box by the machine.

Another object of the invention is to provide a machine which is capable of being operated from a continuously running pulley but which will only produce a tie whenever the attendant depresses a foot-lever and causes the machine to start, whereupon it will complete one tie and stop. However if desired, the foot pedal may be held down when the machine will continue to operate.

Another object of the invention is to provide means whereby the machine will wrap the wire around boxes or bundles from a coil, and will hold the wire under a sufficient tension to cause it to be laid tightly around the bundle or box, without danger of overstraining the wire, and without dragging it over the box corners and thereby injuring the tie.

Another object of the invention is to provide means whereby a bundle will be slightly compressed, or a box tightly held, while the tie is being passed around it thereby insuring the production of a tightly bound package, means being provided to effect the tightening in two planes.

Another object of this invention is to provide means for holding the packages securely when they are being tied, to accomplish which object the bundle holders are adjustable through a considerable distance and they each have springs to prevent injury to the bundles by compressing them should they be uneven in size. These holders are merely for the purpose of preventing the box or bundle from being turned over when being tied.

Another object of the invention is to provide means whereby the bundle-compressing apparatus may be adjusted to accommodate a wide range of sizes of bundles.

Another object of the invention is to produce a machine capable of holding an incompressible box tight enough to be operated on, means being provided to allow the tightening apparatus to give enough to prevent injury to the machine or to the box.

Another object of the invention is to provide means whereby the machine will flatten the twisted wire ends against the side of the box, the box or bundle being automatically pushed away from the position it occupies when being tied to the latter position.

Another object of the invention is to construct the machine of such a form as to give it the maximum strength and stiffness to withstand heavy usage, at a comparatively high speed.

Other objects of the invention will appear as the description proceeds.

Some of the outstanding features of our improved machine may be set forth as follows:

(a) It provides an oscillatory ring for wrapping a wire entirely around a bundle without sliding the wire across the corner of the bundle.

(b) It provides a shuttle and an adjacent pulley which members form two guide means, the shuttle acting to guide one end of the wire into the twister and the pulley acting to guide or lay the wire around the bundle. The wire is transferred from one of these guide means to the other during the initial movement of the rotatable means.

(c) It provides an oscillatory wrapping member with means for rotating it through an arc of slightly more than 360° in each direction. This provides for the wire necessary to form the twist knot and makes it possible for the cut end to extend beyond the cutter on the next stroke so that said cut end may be gripped and held in the twister for the next tie.

(d) It provides means for twisting a corner tie knot without exerting undue stress in the wire, for shifting the position of the bundle, and for pressing the twisted knot against the bundle.

(e) It provides means for disposing the opposite ends of the wire in a twister in overlapped relation whereby the rotation of the twister results in a twist knot.

Other features of our invention will be apparent from the detailed description of the preferred embodiment which is herein specifically described.

An embodiment of the invention is shown in the accompanying drawings in which the same reference numeral is applied to the same portion throughout, but we are aware that there may be modifications thereof.

Fig. 1 is a front elevation of the complete machine looking from the side on which the operator stands, Fig. 1ª is a view in side elevation of a portion of the machine showing the wire carrying shuttle revolved one-half the distance toward the position at which the tie is made.

Fig. 1ᵇ is a side elevation of a portion of the machine showing the wire carrying shuttle revolved to the position at which the wire is ready to be cut off preliminary to the making of the tie, the dotted circles indicating the position of rest of wire carrying wheels.

Fig. 2 is an elevation of the machine looking at it from the side opposite to Fig. 1, Fig. 3 is an elevation of the machine looking at it from the right-hand side of Fig. 1, Fig. 4 is an elevation of the machine looking at it from the left-hand side of Fig. 1, Fig. 5 is a plan view of the complete machine, Fig. 6 is a sectional view, in side elevation, of a portion of the drive-gear and the box within which the gears are installed, Fig. 7 is a sectional view of the worm-wheel which drives the machine, showing the operating clutch, and also showing a portion of the other driving apparatus adjacent to the driving-clutch and driving-worm, Fig. 8 is a view, partly in section, of the Geneva movement and adjacent parts, showing the means for effecting the tying operations.

Fig. 8ª is a view of the wire-twisting apparatus, showing it in position to form one of the hooks on the tie, Fig. 8ᵇ is a side elevation of a left-hand slide for carrying the box discharging bar shown in plan view, in Fig. 5, Fig. 9 is a view, partly in section, of a portion of the frame immediately below the bundle tying tables, illustrating the cams driving the wire-twisting apparatus, Fig. 10 is a plan view of the apparatus for compressing the bundle against the bundle supporting table, parts of the main frame of the machine being omitted for purposes of illustration, Fig. 11 is a front elevation of the apparatus for compressing the bundles against the bundle supporting table, the remaining parts of the machine, save portions of the main frame, being omitted, Fig. 11ª is a side elevation of one of the box holding disks, Fig. 12 is a sectional view on the line A—A, Fig. 11, Fig. 12ª is a side elevation of a portion of the bundle-compressing-apparatus, Fig. 13 is a view, in side elevation, of one of the wire ties, as it appears after it has been passed around a bundle or box and tied, and then cut open at one corner, Fig. 14 is a plan view of that portion of the apparatus which presses the twisted wire ends against the bundle, Fig. 15 is a view, in side elevation, looking from the back of the machine of the apparatus for pushing the twisted wire ends against the bundle, Figs. 16 and 17 are views showing the various positions occupied by the former, which pushes the twisted wire ends laterally so they will always lie on one side of the tie, Fig. 18 is a view illustrating the hammer action for pushing the twisted wire ends against the side of the bundle, Fig. 19 is a view illustrating the position the twisted wire ends occupy after being struck by the hammer shown in Fig. 18.

Fig. 20 is a front elevation of the wire-holding shuttle, showing its relation to the tie-holding pin with the machine at rest, Fig. 21 is a plan view of the parts of the apparatus shown in Fig. 20, Fig. 22 is a front elevation of the wire-holding shuttle, as it appears at the end of its total movement in one direction, the dotted lines indicating the normal position of the same apparatus when at rest at the end of its return movement.

Fig. 23 is a front elevation of the apparatus for clamping the bundle side-ways, the frame of the machine being removed for purposes of illustration, Fig. 24 is a plan of the apparatus for adjusting the operative position of the bundle clamping abutment for clamping the bundle side-ways.

Fig. 25 is a view, partly in section, of a portion of the wire-twisting arm showing the hook-forming arm up, and the cutting arm down, Fig. 26 is a view of a portion of the twisting-arm looking at it in the plane of Fig. 25, showing the hook-forming arm up and the cutting arm down, Fig. 27 is a view of a portion of the twisting arm looking in the same plane as Fig. 25, but showing the cutting arm up and the hook-forming arm coming up to cut off the wire and form the hook.

Briefly, this machine consists of a series of co-ordinating parts intended to automatically perform the operations of first holding the bundle and then carrying the tie-wire around the bundle, straightening it from the coil, cutting it off, running the cut-off length of wire to a position to be ready to tie another bundle, twisting the ends together, moving the bundle to a second position, folding the twisted ends against the side of the box or bundle, and the machine will be described in the order in which those operations take place, as follows:

First: The wire-straightening and tensioning apparatus,

Second: The bundle holding apparatus,

Third: The apparatus for carrying the wire around the bundle, and for restoring the wire end to the initial feeding position, Fourth: The cutting-off and twisting apparatus, Fifth: The means for pushing the bundle out of the tying position, Sixth: The apparatus for flattening the twisted wire ends against the side of the bundle.

The machine has a base 1, of sufficient extent to give it the desired stability, from which base a single flat frame extends upwardly. This frame is considerably wider than it is thick, and it is enlarged to form a ring at its upper end, as indicated at 3, with a circular opening large enough to allow the largest size bundle to pass through, which it is expected to tie.

At one side of the frame there is a bracket 4 which supports a rod 5, said rod being connected to another bracket 6, about the middle of one side of the ring portion of the frame. The bracket 6 also supports several grooved wheels 7, while movable on the rod 5 is a slide 8 which has a horizontally extending shaft 9 to support several other grooved rollers 10. These grooved rollers are for the purpose of taking up the slack of the wire as it passes to the shuttle. The weight of the grooved rollers 10 the bracket 8 and shaft 9 is sufficient to take up all the slack of the tie both when the tie is being passed around the bundle as well as at certain times during which the shuttle is being revolved to the position of rest, following the making of a tie. A rubber bumper 5' is placed on the rod 5 above the bracket 4. The wire is passed between a series of rollers 11 to 15 inclusive, on a horizontally extending bracket 16 above the bracket 6, and is then passed several times around the rollers 7 and 10. This bracket has two laterally extending lugs carrying two rods 19 and 20, forming guide-ways for a slide 21. The slide 21 carries the two rollers 12 and 14, and it is moved laterally by means of the screw 22, said screw being operated by the hand-wheel 23 for moving the slide 21 inwardly or outwardly. The amount of bending of the wire to produce the straightening action is varied by changing the position of the rollers 12 and 14 with respect to the fixed rollers 11, 13 and 15.

On the top of the bracket 16 there is a small adjustable bracket 24 carrying a grooved wheel 25 and a guide 26, through which the wire is led to the wheel 25.

The bracket 24 is adjusted in position by loosening or tightening a screw 27, the object being to allow the reel of wire, to be supplied to the machine, to be placed in any convenient location.

The wire passes to the machine along the dotted line indicated by the letter "W", passing first through guide 26, over the wheel 25, through the straightening rollers 11 to 15 inclusive, but in the reverse order from their numbering, and then around the grooved pulleys 10 and 7 several times, after which it passes over the grooved pulley 28 on the shuttle ring 29. This pulley 28 is supported by a bracket 30 screwed on the side of the shuttle ring 29 which acts as a carrier for the shuttle and wire to encircle the bundle and to restore the wire end to the initial position.

The frame of the machine supports a gear housing 31, which gear housing supports a fixed table 32 carried by a solid post 33 and post 34.

Inside the ring of the main frame and forming an extension is another fixed table 35, and in practice still another table separately from the floor would be placed at the level of the table 35, as indicated at 36, to receive the boxes or bundles from the tying machine, and this table would ordinarily have rollers as indicated at 37 to provide for the easy removal of the boxes or bundles from the machine.

At one side of the table 32 there are two standards or posts 38, 39, which posts support a sheet metal partition 40, against which the bundles or boxes are placed when they are to be tied.

The table 35 is supported from the main frame 2 of the machine by a bracket 35'.

When bundles to be tied are placed in the machine they are placed partially on table 35 and partially on the table 32, in such a position as to permit the movable bundle-clamping post 41 to bear against the bundle and press it against the fixed partition 40. This post 41 is carried by a slidable rack 42 movable in a groove in the slide 42'. This slidable rack 42 has teeth which mesh with a gear 44 on a shaft 45. This shaft is supported by two bearings 43, 43' on the slide 42', (see Fig. 24) and projecting from the bearing 43' is a tube 47 through which the shaft 45 passes. This tube carries a disc 51 at its end, which disc is provided with a series of holes to lock the abutment 41 in any given adjustment. An arm 48 on the shaft 45 carries an operating handle 49 and a pin 51', which pin is normally held in position shown in Fig. 24, by means of the spiral spring 51'' within the arm 48. The locking pins on the handles 49 and 86 are slidable in the bosses carrying them to be inserted in the holes in the disks 51 and 83 or withdrawn therefrom when a change of adjustment is to be made. The slide 42' and abutment 41 are moved by means of the bell-crank arm 53, said arm being pivotally mounted on a pin 54 carried by the main frame and having a roller 55, which is engaged by a cam 56 in cam disk 56' on the shaft 57. A link 58 on the upper end of the bell-crank 53 connects it with a bearing 59 secured to the under-side of the slide 42'. The cam disk 56' rotates clock-wise (see Fig. 23), and the roller is shown in said figure in the position of holding the bundle and just ready to release the same. The release takes place when the high portion "A" of the cam 56 passes under the roller 55, at which time the bundle is pushed forward a given amount to have the twisted tie bent against the side of the bundle, as will be explained in another part of the specification. The length of the high portion "A" determines the amount of time during which the bundle is released, and as soon as the depressed portion "B" reaches the roller 55, the bundle will be again held momentarily during which time the hammer will strike the twisted wire end and force it against the side of the bundle. As soon as this operation has taken place the high portion "C" of the cam 56 will come under the roller 55, thereby releasing the bundle, whereupon the machine will stop and await the placing of a new bundle, or the shifting of the bundle that has just been tied, to a position to receive another tie.

In order to permit the abutment 41 to be brought into engagement with incompressible bundles, such as boxes, the pressure to which such bundles are subjected is regulated by the stiffness of the spring 58', surrounding the rod 58, and bearing against the shackle 53', which connects that rod with the bell-crank 53, and in which shackle the rod 58 is slidable whenever the abutment 41 strikes an incompressible object.

It will be seen from the above description that the abutment 41 may be moved through a considerable adjustment by rotating the arm 48 without altering the adjustment of the link 58, and that as the abutment 41 is moved back and forth, the disc 51 will be moved slightly to correspond therewith, said disc being supported by the fixed tube and slide 42' only.

The means for compressing the package against the bundle supporting table consists of two vertical extending shafts 60, 61, passing through boxes 62, 63 at the top of the main frame, and through bearings 64, 65 just below the level of the table 35. These shafts are provided with rack teeth at their lower ends, as shown in Fig. 11, which rack teeth engage teeth formed on the shaft 66, which shaft extends through a tubular member 67, having integral bearings 68, 69 through which the shafts 60, 61 respectively pass. Just under the main frame bearings 62, 63 there are bearings 70, 71, which bearings are rigidly connected to said shafts 60 and 61, and they support a rod 72 connecting them. The rod 72 supports two arms 73, 74, which arms are connected at their outer ends by means of a rod 75, carrying a plurality of bushings 76, between which bushings are a plurality of discs 77, to bear upon and hold the bundle or box when pressure is applied thereto.

In order to provide for bringing the compressing arms 73, 74, and the discs 77 against incompressible boxes, and the like, the arms are held down by springs 73', 74', which springs rest in cups 73'', 74'', which are carried by the arms 73, 74. These springs bear against set-screws 70', 71' which are carried by lugs 70'', 71'' on the bearings 70, 71.

The tube 67 has an arm 78 rigidly connected thereto, at one end, and said arm carries, rigidly connected therewith, a tube 79 through which the shaft 80 extends. The shaft 80 has a bevel gear 81 thereon in mesh with a bevel gear 82, on the end of the shaft 66. The tube 79 has a disc 83, rigidly connected therewith, at its outer end, which disc is provided with a plurality of holes, as shown at 84, for the purpose of adjusting the height of the rods 60, 61. The shaft 80 carries an arm 85, and this arm has an operating knob 86, with a pin 87 adapted to project through the holes 84 in the disc 83.

A spring 88 holds the operating knob 86 and its pin 87 in the position shown in Fig. 10 normally. It will be seen that if arm 85 is rotated that this will result in the rotation of the shaft 66 and the raising or lowering of the apparatus for holding the boxes or bundles against vertical movement.

Depending from the tubular member 67 is a lug or bracket 89. This bracket has a stub shaft 90 at its lower end, rigidly connected therewith by having the two ears 91, 92 tightened thereon by means of the bolt 93. This shaft carries a small roller 94 which roller extends into the groove 95 of a cam 96. The cam 96 is carried by the main shaft 57.

The bundle having been placed in position in the machine on the tables 32 and 35 is ready to have the wire wrapped around it, and this is accomplished by the apparatus about to be described:

The wire having passed through the straightening-wheels and several times around the take-up wheels or tension-wheels 7 and 10, then passes up over the guide-wheel 28, guide-wheel 97 supported by bracket 98 and then reversely around the guide-wheel 99 on the bracket 100. The object of passing the wire reversely around the guide-wheel 99 is to provide a reverse bend for the wire so as to bring it into shape, such as is illustrated in Fig. 13.

This curving of the wire, shown in Fig. 13, insures having it bear tightly against the bundle throughout its length without pulling it too tightly, whereas, if the curve was in the opposite direction, no amount of pulling would be sufficient to bring it to a straight line because of well-known mechanical considerations.

Having passed around the roller 99, the wire is next laid in the shuttle, which consists of a pointed plate 101, extending parallel to the plane of the ring 29, with a groove to receive the wire, and which plate is secured to the bracket carrying the roller 99 by means of two screws 102 and 103. One side of this plate is cut away to accommodate the eccentric tie-grip 104. This grip is pivoted on a pin 105, and there is a spring 106, to hold it normally engaged with the wire, to prevent the spring of the wire from pulling it out of position when the end of the wire is cut off after the tie has been placed around the box or bundle.

In Figs. 20 to 22, inclusive, the position of the wire holding pin 108, with respect to the shuttle, is illustrated, and Fig. 20 shows the normal position of the shuttle 101 with respect to said pin, when the machine is at rest, in which position the end of the wire has been forced around the pin 108 into the form of a hook.

In Fig. 22 the dotted lines show a position to correspond with Fig. 20, while the solid lines show the amount of more than one complete revolution the wire shuttle has advanced to provide for the cut of the wire passed around the bundle, so that the free length of wire remaining will be the same in length as the quantity required to produce the hook, as shown in Fig. 20.

On the scale of the drawings illustrated, it will be seen in Fig. 20 that the point of the wire shuttle is approximately 1'' from the center of the stop-pin 108, whereas, in Fig. 22, the end of the shuttle is approximately 1½'' from the center of the stop-pin, a little less than this ½'' extra, thus obtained, being required to make the second hook.

When the wire has been pulled around the bundle, it will be seen that the hook end is then secured to the pin 108 (see Fig. 22) from which point the wire passes up and over the bundle again around the pin 108, the pins 177, 178 determining the necessary slackness of the wire. From the pin 108 the wire passes through the plate 101 where it is held in position by the eccentric lock 104 over the top of the wheel 99 then under said wheel, and then under the guide wheel 109 shown in Fig. 1ª, from which the wire then passes over one of the tensioning wheels 7. When the tie has been made and the shuttle revolves to its original position, the wire slack is taken up by the weight of the wheels 10 and it passes entirely off the wheel 109.

The ring 29, carrying the shuttle and wire supporting wheels, is in turn supported by three wheels 111 to 113, inclusive, which wheels are placed 120 degrees apart and are supported from three inwardly projecting lugs 114 to 116, inclusive, on the main frame. This ring is driven by a gear 117 on the shaft 118. The gear 117 is driven from a pinion 119 on the shaft 120, through the medium of the small pinion 121 on the same shaft as the gear 117.

The main frame has suitable bearings 122, 123 for the two shafts 118 and 120 respectively, and the shaft 120 has a pinion 122' thereon, which is in mesh with a rack-bar 123' at the lower end of which there is a bearing 124 to receive the adjustable crank-pin 125 for driving it.

The rack 123' passes through a slide 126, which holds it in engagement with the pinion 122'. This slide has two ears 127, 128 which are pivoted on shaft 126 to allow the rack-bar 123' to swing as may be necessary in its travel with the crank-pin 125.

As explained, in connection with Figs. 20 to 22 inclusive, it is necessary to rotate the wire shuttle slightly more than one complete turn, and the amount of this rotation is determined by the throw of the rack-bar 123'. A rough adjustment is, of course, attained with the gears 119, 121, 117, but the finer adjustment, to bring the wire-holding shuttle to the precise point required, is obtained through the adjustment of the crank-pin 125, which is slightly eccentric to the pin carrying it which projects through the cam disc 56', and which latter pin is adjusted, as may be required, by the rotation of the set-screw 129. This adjustment makes it possible to increase or diminish the total throw of the wire-holding shuttle, so as to produce a hook of a uniform size each time, the shuttle always returning to the position shown in Fig. 20, when the machine stops, at which moment the first hook will be formed on the wire-holding pin 108. The wire-holding pin is carried by the wire-twister 131, which is supported in the bearings 132, 133 to extend at an angle of about 45 degrees from one corner of the bundle, with its upper end closely in proximity thereto. This twister carries the combined hook former and cutter 134, and the cutting-arm 135. Both of these members are pivotally mounted on a pin 137', and they each have some gear teeth formed thereon, which teeth mesh with teeth 138, 139 respectively, on the slidable rods 140, 141.

The wire-twisting arm 131 is carried by a tubular shaft 140', which tubular shaft passes through a spiral gear 141' within the gear casing 142. This spiral gear is in mesh with a spiral gear 143 rotating on an axis at right angles thereto, the latter gear supported on the shaft 144.

The shaft 144 also carries a gear 145 in mesh with a gear 146 on the shaft 147.

The shaft 147 also supports a four-point Geneva-stop-movement cam 148. This cam is driven by a small roller 149 on the arm 150, and the cam is held in the four stop positions by means of a circular disc 151, having a sector-like portion cut out on one side, as indicated at 152. Inside the tubular shaft 140' there is a tube 153, and inside that tube there is a rod 154. The tube 153 is connected to the push-rod 140 by means of a lug 154', while the rod 154 is connected to the push-rod 141 by means of a lug 155.

At its lower end the tube 153 carries a grooved collar 156, while the rod 154 carries a grooved collar 157.

Yokes 158, 159 are pivotally mounted on the main frame at 160, 161 respectively, and they have a pin on each side for engagement with the two collars 156, 157, the pin being shown at 162, 163.

The arms 158, 159 have depending members 165, 166 connected therewith, which arms are in turn connected with connecting links 167, 168. The end of the link 168 is pivotally supported by a bell-crank lever 169, while the end of the link 167 is supported by another bell-crank lever 170; both of these bell-cranks are pivotally mounted on a pin 171, and they have the rollers 172, 173 which pass into differently shaped grooves in a disc-cam 174. The cams on the disc 174 are so arranged as to advance and retract the cutter abutment and hook-forming cutter at the proper moment to produce the hook, and then to cut off the wire, and immediately thereafter produce the second hook.

The cam 174 is carried by the main shaft 57. The operation of the twister is as follows:

Assume the wire to be placed in position under the fixed-pin 108, the hook-forming member 134 is pushed up against the wire to bend it around the pin 108. During the time it is being carried around the package, the member 134 is pulled down out of the way and the member 135 is pushed up (note Fig. 27). When the shuttle has moved the wire to the position shown in Fig. 22, the hook-former is again pushed up (note Fig. 27, where it is about to cut off the wire), and immediately on cutting off the wire, the second hook is formed, the pressure of the cutter against the wire and against the pin 108 being sufficient to prevent the cut-off length of wire from pulling away from the pin 108 and thereby releasing the bundle. At this time the wire passes around the tensioning fingers 177, 178.

It will be understood by those skilled in the art that if the wire is passed around the bundle or box as tight as it should be on all sides, and if an attempt is then made to twist the wire together to secure the tie, that the wire is more likely to be twisted off and broken than it is to be properly tied.

In the present machine the wire is laid first over the tensioning pin 177, then is laid flat along the top of the bundle, then flat along one side and then under the tensioning pin 178, thereby leaving two sides slack by the distance the pins 177, 178 are placed away from the box or bundle. This slackness is necessary to provide the necessary length of wire to produce a suitable twist, and in the present instance, the twist is begun from a point distant from the box and is carried from that point toward the box so that when all of the slack of the wire has been taken up the twist will be complete.

The pins 177, 178 are carried by bars 179, 180, and by turning them, the amount of slack produced is increased or diminished until the proper amount of wire is left to produce the desired twist at the joined ends of the tie.

The pins 177, 178 are held in any given adjustment by means of the set-screws 181, 182. Fig. 6.

The bar 179 is slidable in recesses in the two posts 38 and 39, and the two bars 180, 181 are slidable in the grooves in the table 32, and they support a plate 180', which plate is used to push the box from the position in which the tie is made to the position in which the ties wire ends are flattened against the side of the box.

The bar 181 supports the pin 178. The bar 179 is carried by a plate 183 connected to the slide 184, which slide has a depending lug 185, pivotally connected to a link 186. The other end of the link 186 is pivotally connected to the top of the lever 187, this lever being pivotally connected at 188, at the top of the gear-enclosing casing 190. The lower end of this lever is off-set, and has a roller 191, which passes into a groove formed by the two cam members 192, 193. These two cams are carried on the main shaft 57, and they are shaped to produce two movements of the rods 179, 180. That portion of the cams marked "D" is intended to push the box or bundle ahead a given amount to the position in which the twisted wire ends are flattened against the side of the box or bundle, while that portion of the cams at "E" is intended to retract the pins 177, 178 enough to release them from the wire, just prior to the twist and just prior to the advancement of the box to the new position, after the twist has been made. The remainder of the cam surfaces simply hold the pins 177, 178 in the operative position.

A flat bar 180' extends over the table, pushing the box or bundle forward to the position for bending the wire ends against the box, and with the bar 179 positively insures the stripping of the wire ends off the twisting pin 108.

The bar 180' is long enough to engage the twisted wire ends, and to engage the box or bundle substantially throughout the entire width of the table 32. It is carried by two arms 180, 181, which arms are pivotally mounted in the two slides 184, 184'. The bar 180' is placed so it will engage the back of the tie under the entire width of the bundle and one end thereof projects into proximity to the wire twisting pin 108, so that when the twist is completed the wire is stripped off said pin 108 by the forward movement of said plate.

Springs 193, (see Fig. 8ᵇ) cause the arms just described to press up against the bundle or box, and as the bar 180' is shaped to catch the tie, the box is readily pushed forward when engaged by said bar, upon the operation of the levers 187, 187', the latter of which is also carried by the shaft 188 and which causes the bar 180' to be evenly advanced.

Within the gear box 190 the shaft 57 carries the worm-wheel 195, which wheel is in engagement with the wheel 196 on the main driving shaft. The shaft 197 is supported by two bearings 198, 199 on the gear box and by a bearing 200 at the outer edge of the main frame. This shaft 197 carries a pulley 201 around which a belt 202 is driven by the motor 203 supported on the bracket 204, at one side of the main frame.

The worm-wheel has a flange 195' overhanging a boss 205 which is rigidly connected to the driving-shaft 57. This boss carries pawl 206, which may engage in one of the notches 207 of the flange 195', if not prevented from so engaging said notches by the arm 208. The arm 208 is mounted on and rigid with a shaft 209, which shaft is journaled 210, 211. These bearings are at the lower portion of the gear box 190 and the arm 208 is held normally in the position shown in Figs. 6 and 7, by means of the spiral spring 212, the spring being attached at one end to the bearing 210, and at the other end to a collar 213 on the shaft 209. At its opposite end the shaft 209 has a lever 214 connected therewith, which lever is in turn connected to a link 215, which link is in turn connected to the foot-pedal 216 which may be arranged to stand in any convenient location.

The operation of the parts just described is as follows:

Assuming the shaft 197 to be continuously rotating, the worm-wheel 195 will be continuously rotating idly until the operator releases the pawl 206 and allows it to drop into one of the notches of the flange 195' from the position shown in Fig. 7. This will start the shaft 57 into rotation, and as the foot-pedal is at once released, said shaft will continue in rotation until it has made precisely one revolution, whereupon the arm 208 will push the pawl 206 out of engagement with the worm-wheel, and the machine will stop.

It will be seen that the shaft 57 is provided with two journal bearings 216, 217, which are bolted to the gear-box 190 and the main frame 2 respectively.

It may be noted, at this point, that as the machine is working under different stresses, at different times, that it is an advantage to provide means for slightly retarding it and this consists of the brake-wheel 218 rigidly connected to the end of the shaft 57, the brake-band 219, holding arm 220 and stop-pin 221. The pressure of the brake on the wheel 218 is regulated by the bolt 222. The pressure applied to the wheel 218 is obviously only sufficient to cause the machine to run steadily and not race at certain parts of its movement.

After having completed the tie the box or bundle is pushed forward about 6" further into the machine to place it in a position to have the twisted wire ends pushed up against the box.

The bar 180' effects this movement while the apparatus, illustrated in detail in Figures 14 to 18, illustrates the manner of its accomplishment. In these figures the box is illustrated at "BB".

After the box has been tied, it will be pushed forward far enough to bring the tie over the tie bender 225. The tie always has a certain number of turns and, of course, since the twisting apparatus always brings the wire to a certain position, it is desirable to have the twisted ends of the tie bent up in a certain way to give them the greatest holding effect. In the present instance (note Fig. 19), it is found desirable to bend the twisted ends of the wire ahead of the tie, and then up against the box.

The tie-bender is carried by a rod 226 and its upper edge is cut away to form a receiving pocket 227, shaped to bend the twisted ends of the tie in the desired direction. The position in which the bent over tie ends should be left depends on the final position of the twisted together ends of the tie, i. e. the twisted ends should be bent up so they will not loosen the tie and so they will not reverse the bend of the wire at the point where they are bent up against the box. This bend might be back of the tie if the twister stopped the twist in a position to make that necessary.

The rod 226 is mounted on an upwardly projecting lug 228, which lug is pivotally mounted on the shaft 229. This shaft also supports an arm 230 which has teeth at 231 to engage the teeth of a pinion 232. The pinion 232 is rigidly connected with a shaft 233, which shaft carries, rigidly connected therewith a hammer-cam 234. Below the cam 234 there is a pin 235 which pivotally supports a bell-crank 236, one end of which carries a roller 237, which is in a position to be struck by the cam 238 on the drive-wheel 56'. A spring 239 holds the roller normally in the position shown in Fig. 15.

The other end of the bell-crank has a link 240 pivotally connected thereto, which link has a pivot-pin 241 at its upper end which passes through a slot 242 in the arm 230.

The cam 238 is connected to the outside drive-wheel 56' by means of a bolt 238' passing through the rim of said drive-wheel. The operation of the parts just described is as follows:

Assuming the box to be in the position illustrated in Figs. 14 and 15, the cam 238 will strike the roller 237. This will raise the hammer 234 and its action will cause the tie-bender 235 to be pushed up against the twisted ends of the wire. Owing to the shape of the pocket 227, this bender will be pushed up and twisted at the same time, the twist causing the wire ends to be bent over in front of the plane of the tie.

As soon as the tie-bender 225 passes the wire ends, the face of the hammer-cam 234 will strike the twisted wire ends and flatten them down against the side of the box.

The operation of the machine is as follows:

The wire from any suitable source of supply is passed through the straightening rollers in the order 15 to 11 respectively. It then passes, several times, around the take-up wheels 7 and 10 from one of the upper take-up wheels 7 it passes over the wheels 28 and 97, on the ring 29, to the wheel 99, around which it passes one complete turn, the end being held in place in the shuttle 101 by the eccentric 104. The object of passing the wire around the wheel 99, one complete turn, is to bend it so it will have a curve such as illustrated in Fig. 12. At this time the end of the wire will be bent around the stop-pin 108, and the machine is ready to start.

A box or bundle is then placed in such a position, on the table 32 as to have the tie made at the desired place, thereupon the operator places his foot on the pedal 216, thereby dropping the pawl 206, which will thereupon engage one of the notches 207 on the wheel 195. This will start the main shaft into rotation.

The first effect is to cause the vertical bundle-holding apparatus to move downwardly, the cam 96 effecting this, while, at the same time, the cam on the back of the wheel 56' will cause the abutment 41 to engage the side of the bundle, whereby it is firmly held during the tying operations. During this same time, the rack-bar 123 will be moved on its forward stroke thereby rotating the ring 29 anti-clock-wise Fig. 1. This rotation will cause so much of the wire as is then passing over the wheels 28 and 97 to be taken up by the weight of the wheel 10 and the slide carrying them.

The rotation of the ring 29 continues until the shuttle has assumed the position shown in Fig. 22, which is, in the present machine something over ½" more distant from the holding-pin 108 than its initial position, this being necessary to provide for cutting off the wire and making the second hook (note the formation of the first hook in Fig. 8ª and the position occupied by the cutters in making the second hook in Fig. 27).

When the wire assumes the position shown in Fig. 22 it passes under the wheel 99 and under the wheel 109. At this time the wire has been passed around the bundle and around the slack-holding pins 177, 178.

As soon as the shuttle reaches the end of its throw, the wire is cut off by the cutter 135 and hook-former 134, and the second end is bent around the pin 108. The shuttle immediately starts on its return to the initial position, and as soon as it is clear of the twisting apparatus, the twister 131 rotates two complete turns just previous to which the slack-holders 177, 178 have been retracted to allow the wire to pass off them to produce the necessary slack to produce the tie.

The wire is twisted from the hooks toward the box, and the length is so arranged as to cause it to be tight when two complete turns have been made. As soon as the two complete turns have been made, the bundle-holding abutments are released whereupon the bar 180' is advanced for the purpose of pushing the two hooks off the hook-holding pin 108, and for the purpose of pushing the bundle far enough ahead to have the tie-bender 225 and hammer 234 bend the twisted wire ends forwardly and finally upward against the box to leave the finally twisted ends in the most mechanical position as far as producing a strong tie is concerned.

During this time, the rack-bar 123 is returned to its initial position, and returning the ring 129 to its initial position. In the meantime, the workman will, of course, have removed his foot from the lever foot-pedal 216 so that the arm 208 will cause the pawl 206 to be disengaged from the notch 207, which it is then engaged with, and the machine will stop, having completed the cycle of operations.

What we claim is as follows, but various modifications may be made in the construction shown in the drawings and above particularly described form, within the purview of our invention.

1. A bundle tying machine comprising a table, means on the table for holding the bundle, oscillatory ring means to carry a tie wire around the bundle without dragging the tie wire across the bundle corners, means to twist the ends of the tie together, and means to bend the twisted tie ends against the bundle.

2. A bundle tying machine comprising a bundle supporting table, means to hold a bundle thereon, an oscillatory annular carrier for placing a tie wire around a bundle, means to hold the tie wire, means to cut it off, means to restore the carrier to its original position, and means to twist the tie ends together.

3. A bundle-tying machine comprising a table, means thereon to hold a bundle in a fixed position, an oscillatory shuttle ring for carrying a tie wire around the bundle, means to hold said tie wire slack a definite amount, means to remove the slack-holding mechanism from the tie wire when the tie has been passed completely around the bundle, means to sever the tie wire and means to thereupon twist the ends of the tie together.

4. A bundle-tying machine comprising a table, means to secure a bundle thereon, an oscillatory shuttle ring for carrying the tie wire around the bundle, means to sever the tie wire, means to produce a hook on both of the tie ends and to hold said ends of the tie together, said means being also capable of rotation to twist the ends of the tie together from their outer portions toward the bundle and means to rotate the hook forming mechanism to form a twist to connect both ends of the tie together.

5. A bundle-tying machine comprising a table, means to clamp a bundle thereon in two directions, means to pass a tie wire around a bundle, means to sever the tie wire and means to twist the ends of the tie together to secure the bundle.

6. A bundle-tying machine comprising a table, means to secure a bundle thereon against movement, an oscillatable tie wire-carrier operable to carry a tie wire around a bundle, means to sever the tie wire, means to hold the ends of the tie wire together, said means also being rotatable to twist the ends of the tie together to secure the bundle, means to rotate the tie end holder to secure the tie ends together and means to press the twisted ends of the tie against the side of the bundle.

7. A bundle-tying machine comprising a table, means to secure a bundle thereon, means to pass a tie wire around the bundle, means to sever the tie wire, means to twist the ends of the tie together after it has been passed around the bundle, means to shift the bundle from one position to a second position upon the table and means to thereupon press the twisted ends of the tie against the side of the bundle.

8. A bundle-tying machine comprising a table, means to secure a bundle thereon, means to carry a tie wire around the bundle, means to sever the tie wire, means to twist the ends of the tie together after it has been carried around the bundle, means to move the bundle to a second position upon the table and means to flatten the ends of the wire-tie against the side of the bundle 9. A bundle-tying machine comprising a table, means to secure a bundle thereon, an annular oscillatory shuttle carrier to place a tie wire around the bundle and to carry the wire end to the initial position, means to hold the tie wire under tension when being passed around the bundle without dragging the wire across the corners of the bundle, means to sever the tie wire and means to twist the ends of the tie together.

10. A bundle-tying machine comprising a table, means to clamp the bundle on the table, an oscillatable shuttle to carry a tie wire around the bundle, means to sever the tie wire, means to oscillate the carrier with a fresh tie-end to its initial position, means to secure the ends of the tie together, and means to flatten the ends of the tie against the side of the bundle.

11. A bundle-tying machine comprising a table, means to clamp a bundle thereon, means to pass a tie wire around the bundle, means to sever the tie wire, means to secure the tie-ends together, means to advance the bundle to a second position in the machine, and means to flatten the tie-ends against the bundle at said second position.

12. A bundle-tying machine comprising a table, means to clamp a bundle thereon, means to pass a tie wire around the bundle, means to sever the tie wire, means to twist the tie-ends together, means to advance the bundle to a second position in the machine, means to bend the tie-ends forwardly, and means to flatten the tie-ends against the side of the bundle.

13. A bundle-tying machine comprising a table, means to hold a bundle on the table, means to pass a tie wire around the bundle, pins to hold the tie slack, means to remove the slack-pins from the tie, means to sever the tie wire and means to secure the tie-ends together.

14. A bundle-tying machine comprising a table, means to hold a bundle thereon, an oscillatory shuttle holder to carry a tie wire around the bundle, means to thereupon cut the tie, means to carry the fresh tie-end to the initial position, means to hold the tie under tension at all times, means to twist the tie-ends together, and a hammer to flatten the tie-ends against the side of the bundle.

15. A bundle-tying machine comprising a support, means to secure a bundle thereon, an oscillatory carrier to carry a tie wire around the bundle, means to cut off the tie, means to carry the tie to the initial position, means to hold the wire under tension, means to hold the wire ends together, means to twist the tie-ends together and means to flatten the tie-ends against the bundle.

16. A bundle-tying machine comprising a support, means to clamp a bundle thereon, means to pass a tie wire around the bundle, means to twist the tie-ends together, a plate to strip the tie off the twister, means to shift the bundle to a second position in the machine, and means to bend the tie-ends forwardly and then press them against the side of the bundle.

17. A bundle-tying machine comprising a bundle support, an oscillatory ring means to pass the tie wire around the bundle, means to take up the slack wire at that time and during the carrying of the wire end to the initial position, and a rotary twisting apparatus for securing the tie-ends together.

18. A bundle-tying machine comprising a bundle support, an oscillatory shuttle to place a tie wire around the bundle, means to sever the tie wire, means to twist the tie-ends together, means to shift the bundle to another position in the machine and means to press the tie-ends against the side of the bundle.

19. A bundle-tying machine comprising a support, means to secure a bundle thereon, an annular oscillatory shuttle carrier, means to turn the carrier to encircle a bundle with a tie wire, means to cut off the tie wire, means to twist the tie-ends together and means to cause the machine to move through one complete cycle and then return to its original position.

20. A bundle-tying machine comprising a support, means to clamp a bundle thereon, means to adjust the clamp to take a number of bundles of different sizes and an oscillatory shuttle ring to carry a tie wire around the bundle when it is clamped on the support, means to cut off the tie and means to twist it together to secure it around the bundle, the shuttle ring being capable of carrying the tie-end to the initial position.

21. In a bundle-tying machine, the combination of a support, means to secure a bundle thereon, an oscillatory shuttle carrier capable of carrying the length of wire around the bundle, means to cut off the wire, and means whereby the carrier will restore the wire on its reverse movement to its initial position, means to secure the tie on the bundle, and means to take up the slack of the tie both when the tie is being passed around the bundle, and when it is being returned to its normal condition.

22. In a bundle-tying machine, the combination of a support, means to secure a bundle thereon, means to adjust the securing means to take different size bundles, means to sever the tie wire, an oscillatable ring carrier to carry a tie wire around the bundle and to carry the cut-off end back to the initial position preparatory to the making of another tie, and means to take up the slack of the tie wire both when the tie wire is being passed around the bundle and when it is being returned to its normal condition.

23. In a bundle-tying machine, the combination of a support, means to secure a bundle thereon, an oscillatory shuttle ring to carry a tie wire around the bundle, means to cut off and hold the tie wire, means to reversely turn the ring to its initial position and means operating after the tie is cut to secure the tie-ends together at the corner of the bundle, the tie being twisted from its ends toward the bundle.

24. In a bundle-tying machine, the combination of a support, means to secure a bundle thereon, an oscillatory shuttle ring to carry a tie wire around the bundle, a holding pin, means to form the tie-ends into two hooks around said pin and means to rotate the pin to secure the tie-ends together.

25. In a bundle-tying machine, the combination of a support, means to secure a bundle thereon, an oscillatory carrier to carry a tie wire around the bundle, means to cut off the tie after which the carrier returns the tie wire end on its reverse movement to its initial position, means to take up the slack of the tie when it is being carried around the bundle, and means to secure the tie-ends together, at one corner of the bundle.

26. In a bundle-tying machine, the combination of a support, means to secure a bundle thereon, means to carry a tie wire around the bundle, means to cut the tie wire, means to secure the tie-ends together, means to shift the bundle to another position in the machine, means to hold the bundle in said second position and means to flatten the tie-ends against the side of the bundle.

27. In a bundle-tying machine, the combination of a support, means to hold a bundle thereon, oscillatory means to carry a tie wire around a bundle, means to sever the tie wire, a single pin to support both ends of the tie, means to form the tie-ends into hooks on said single pin, and means to rotate the pin on a transverse axis to twist the wire ends together.

28. In a bundle-tying machine, the combination of a support, means to secure a bundle thereon, an oscillatory shuttle ring to carry a tie wire around the bundle without dragging the corners of the bundle, means to take up the tie wire slack and tension the wire while it is being carried around the bundle, a cutter to sever the ties into lengths to correspond with the size of any bundle, and means to secure the tie-ends together.

29. In a bundle-tying machine, the combination of a support, means to secure a bundle thereon, means to carry a tie wire around the bundle when secured on the support without sliding the wire on the corners of the bundle, means to cut off the tie wire of any length to suit the bundle, means to form a hook on each end of the tie and means to twist the ends of the tie together.

30. In a bundle-tying machine, the combination of a support, means to secure a bundle thereon, an oscillatory shuttle ring to carry a tie wire around the bundle when secured on the support, means to cut off the tie wire to suit any bundle, said shuttle ring being also capable of carrying the wire end back to the initial position after it has been cut off, means to take up the slack while the wire is being carried around the bundle, means to twist the wire ends together, and means to flatten the tie-ends against the bundle.

31. A bundle-tying machine comprising a bundle holding mechanism, a tie wire holder, means to place a tie wire around bundles of different lengths, means to cut the tie wire, means to form hooks on the ends of the tie, and means to rotate said hooks to secure the tie-ends together.

32. In a bundle-tying machine, means to hold a bundle, an oscillatable shuttle carrier adapted to carry a tie wire around the bundle, means to cut off the tie the proper length regardless of the size of the bundle, means to form the ends of the tie into hooks, a clamp on the shuttle to hold the wire end in the shuttle when it is cut off, and means to twist the ends of the tie together.

33. A bundle-tying machine comprising means to hold a bundle, an oscillatory annular shuttle carrier to carry a tie wire around the bundle, means to cut off the tie wire, said shuttle carrier being capable of oscillation to restore the cut-off wire to the initial position, means to secure the ends of the tie together, means to bend the ends of the tie against the bundle after they have been secured together.

34. A bundle-tying machine comprising means to hold a bundle, an oscillatory shuttle ring to carry a tie wire around the bundle, means to take up the slack of the tie wire during a portion of the movement of said shuttle ring, means to cut the tie-wire, means to twist the wire ends together, means to shift the bundle to a second position in the machine, and means to thereupon flatten the ends of the tie against the side of the bundle.

35. A bundle-tying machine comprising means to hold a bundle, a shuttle carrier to carry a wire around the bundle, cutters to sever the wire into proper lengths, means to form each tie-end into a hook, an eccentric carried by the shuttle to hold the wire end from springing out of the shuttle when it is cut off and means to then twist the wire ends together.

36. A bundle-tying machine, comprising means to hold a bundle, an annular shuttle carrier within which the bundle is placed, a shuttle on the carrier to hold a tie wire, means to oscillate the carrier substantially one turn in both directions around the bundle to place a tie thereon and to restore the carrier to the initial position, means to cut the tie the proper length and means to twist the tie ends together.

37. In a bundle-tying machine, the combination with means to hold a bundle, of an oscillatable shuttle ring capable of carrying a tie wire around the bundle, means to hold the tie wire slack a given amount as it is passed around the bundle, means to tension the wire at the same time, means to remove the slack holders from engagement with the tie, means to sever the tie wire, and means to thereupon secure the ends of the tie together.

38. In a bundle-tying machine, an annular shuttle carrier within which a bundle is placed to be tied, means to oscillate the shuttle carrier to carry a tire wire around the bundle, means to sever the tire wire, and means to secure the ends of the tie together.

39. In a bundle-tying machine, the combination of an annular shuttle carrier within which the bundle is placed to be tied, means to oscillate the shuttle carrier to carry the tie wire around the bundle, means to bend the tie convex toward the bundle, means to sever the tie wire, and means to secure the ends of the tie together.

40. In a bundle-tying machine, means to secure a tie around a bundle, means to shift the bundle to a second position in the machine, and means to thereupon flatten the tie ends against the bundle.

41. A bundle-tying machine comprising means to hold a bundle, an oscillatable wire carrier to apply a tie wire thereto, means to cut off the wire tie, said carrier being capable of oscillation to restore the cut-off wire to its initial position, means to form hooks on the ends of the wire-tie and to hold them together, and means to twist the tie-ends to secure the tie on the bundle.

42. In a bundle-tying machine, means to hold a bundle, an oscillatory shuttle carrier to pass a tie wire around the bundle, a tie-holding pin, means to cut the tie wire associated with the holding pin, means to form both ends of the tie into hooks on said pin, and means to twist the ends of the tie together.

43. A bundle-tying machine comprising means to hold a bundle, an oscillatory shuttle ring to carry a tie wire around the bundle, a pin, means to sever the tie wire, means to form the ends of the tie into hooks on said pin, and means to rotate the hooks to secure the tie on the bundle.

44. In a bundle-tying machine the combination of means to hold a bundle, a shuttle to carry a tie wire around the bundle, pins to hold the tie wire slack a given amount when being passed around the bundle, means to sever the tie wire and means to thereafter twist the ends of the tie together.

45. In a bundle-tying machine the combination of means to hold a bundle, a shuttle to carry a tie wire around the bundle, pins to hold the tie wire slack on the bundle a given amount, means to remove said pins from the tie after it has been passed completely around the bundle, means to sever the tie wire, and means to thereupon twist the ends of the tie together.

46. In a bundle-tying machine the combination of means to hold a bundle, a shuttle to carry a tie wire around the bundle, means to sever the tie wire, means to secure the ends of the tie together, means to shift the bundle to a second position in the machine, and means to bend the secured tie-ends toward the bundle ahead of the tie.

47. In a bundle-tying machine the combination of means to hold a bundle, a shuttle to carry a tie wire around the bundle, means to sever the tie wire, means to hold the ends of the tie together, means to twist the tie ends together and a movable plate to strip the ends of the tie off the twisting mechanism.

48. In a bundle-tying machine the combination of means to hold a bundle, means to carry a tie wire around the bundle, means to sever the tie wire, means to form each tie end into a hook, means to twist the ends of the tie together, and means to bend the twisted tie ends toward the bundle ahead of the tie.

49. In a bundle-tying machine the combination of means to hold the bundle, an oscillatory shuttle to carry a tie wire around the bundle, means to sever the tie wire, means to twist the ends of the tie together, means to bend the twisted ends of the tie toward the bundle ahead of the tie and means to thereupon flatten the twisted tie-ends against the bundle.

50. In a bundle-tying machine the combination of means to hold a bundle, an oscillatory shuttle to carry a tie wire around the bundle, means to cut off the end of the tie, said shuttle being capable of oscillation to carry the tie wire end to the initial position, means to form the ends of the tie into hooks, means to twist the ends of the tie together, and a hammer for flattening the twisted tie-ends against the side of the bundle.

51. In a bundle-tying machine the combination of means to hold a bundle, means to pass a tie wire around the bundle, means to sever the tie wire, a pin on which each end of the tie is formed into a hook, means to secure the ends of the tie together, and mechanism for causing the machine to stop after having completed a full cycle.

52. A bundle-tying machine comprising an oscillatable carrier to place a tie wire around a bundle, means to cut off the tie, said carrier being capable of oscillating to carry the tie wire end to the initial position to form another tie, means to form the ends of the tie into hooks, and means to rotate said hooks to twist the tie ends together.

53. In a bundle-tying machine, the combination of an oscillatable annular shuttle ring to place a tie wire around a bundle, means to cut off the tie wire, said shuttle ring being capable of oscillating to carry the wire end to the initial position, means to hold the tie wire ends when the tie is cut, and means to secure the tie ends together.

54. In a bundle-tying machine the combination of an oscillatory shuttle ring, a shuttle thereon to hold a wire end, means to turn the ring to carry a wire around the bundle, means to cut off the wire, means to hold the wire end on the shuttle when the wire is cut, means to oscillate the shuttle to carry the tie wire end to the initial position, means to hold the wire slack on the bundle and means to twist the wire ends together when cut.

55. In a bundle-tying machine the combination of the shuttle to carry a tie wire around a bundle, means to sever the tie wire, means to hold the ends of the tie together, a pin and cutter to form the tie ends into two hooks, and means to rotate the pin and cutter to twist the tie-ends together.

56. In a bundle-tying machine the combination of a shuttle to carry a tie wire around a bundle, means on the shuttle to hold the tie wire end when a tie has been cut off, a pin for holding the two ends of the tie, and means to twist the two ends of the tie together.

57. In a bundle-tying machine the combination of oscillatable means to carry a tie wire around a bundle, wheels for taking up the slack of the tie wire and for tensioning it as it is being passed around the bundle, means to cut off the tie, means to oscillate the tie carrier to carry the tie ends to the initial position and means to secure the tie-ends together.

58. In a bundle-tying machine the combination of a shuttle to carry a tie wire around a bundle, pins for holding the tie slack on the bundle a given amount, means to remove said pins from the tie, means to sever the tie wire, and means to thereupon twist the tie ends together.

59. In a bundle-tying machine the combination of a shuttle to carry a tie wire around a bundle, means to sever the tie wire, means to secure the ends of the tie together, means to shift the bundle to a second position in the machine, and means to thereupon flatten the tie ends against the bundle.

60. In a bundle-tying machine the combination of a shuttle to pass a tie wire around a bundle, means to sever the tie wire, a pin for holding the tie ends, means to form the tie ends into hooks on said pin, means to twist the tie-ends together when on said pin, means to strip the hooks off the pin, and a hammer for flattening the twisted tie ends against the bundle.

61. In a bundle-tying machine a shuttle to pass a tie wire around a bundle, means to sever the tie wire, a pin for holding the ends of the wire tie, means to twist the ends of the wire tie together, a plate for pushing the bundle to a second position in the machine and for stripping the tie off the means for twisting the ends of the tie together and means to thereupon flatten the twisted tie ends against the side of the bundle.

62. In a bundle-tying machine the combination of a shuttle to pass a tie wire around a bundle, means to sever the tie wire, a pin to hold the tie ends, means to revolve said pin to twist the tie-ends together, means to shift the bundle, means to strip the tie-ends off said pin, means to push the twisted tie-ends ahead of the tie, and a hammer for flattening the tie ends against the side of the bundle.

63. In a bundle tying machine, a bundle support, bundle holding means, a shuttle carrier, a shuttle thereon to hold a wire end, means to turn the carrier to carry a wire around the bundle, means to thereupon cut off the wire, means to hold the wire under tension around the bundle, means to restore the carrier to its initial position and means to twist the wire ends together.

64. In a bundle-tying machine a table, an annular shuttle carrier, a shuttle thereon, means to turn the carrier once in each direction to encircle the bundle with wire and to restore the wire end to the initial position, means to cut off the wire when the bundle is encircled, means to then hold the wire end in the shuttle, means to hold the cut-off wire tight around the bundle, and means to thereupon twist the wire ends together.

65. A bundle-tying machine comprising means to pass a wire around a package under tension, means to hold the wire out of contact with said package on a portion of two adjacent sides of said package, means to sever the wire, means to twist the ends of said wire together from the outer ends toward the package, and means to withdraw said holding out means as the ends of said wire are twisted together.

66. A bundle-tying machine comprising means to hold a package, means to carry a wire around the package under tension, means to hold said wire away from contact with said package adjacent one portion of said package, means to cut off said wire to form ends to be twisted together in said portion, means to twist said wires from the ends thereof toward the package to bring the wire tight against the package as said means to hold said wire away is withdrawn.

67. A bundle-tying machine comprising a frame, an oscillatory shuttle ring mounted to oscillate first in one direction and then in the other in said frame, means to oscillate said ring, means to hold a package inside of said ring, a wire holding shuttle on said ring to carry a wire around said package, means to sever the wire, means to form hooks on the ends of said wire, means to turn said hooks to twist the ends of the wire together, means to straighten said wire, and means to regulate the tension thereon.

68. A bundle-tying mahine comprising a frame, an oscillatory shuttle ring mounted to oscillate in said frame, power means to oscillate said ring, means to connect said power means to cause said ring to oscillate a complete revolution, and then return to its original position, a wire holding shuttle on said ring to carry a wire under tension around a package without dragging it across the corners of said package, means to sever the wire, means to twist the ends of said wire together to form a tie, and means to hold said wire away from the package adjacent the twisting means, means to withdraw said holding means so the ends are twisted together, to relieve the strain on the wire and prevent breakage thereof.

69. A bundle-tying machine comprising an oscillatory shuttle ring, a wire holding shuttle on said ring, means on said ring to guide the wire to said shuttle, means to hold said wire under tension, means to take up slack in said wire due to the movements of said ring, means to sever the wire, a twisting pin, means to bend the ends of the wire over said pin to form hooks thereon, means to rotate said pin, means to hold said wire away from contact with said package adjacent said twisting pin, means to release said wire as the twist is made, and means to bend said twisted ends flat against the package.

70. A bundle-binding machine comprising an oscillatory annulus oscillatable about its axis, a bundle holding means within said annulus, means for oscillating said annulus for wrapping a wire entirely around a bundle without sliding the wire across the face of the bundle, a cutter, a twister, and means for actuating the above elements whereby the wire is automatically led through the twister around the bundle and back through the twister, cut and twisted.

71. A bundle-binding machine comprising a ring oscillatable around its axis, a bundle holding means within said ring, means for oscillating said ring in one direction for wrapping a wire entirely around the bundle without sliding the wire across the face of the bundle, two guides carried by said ring, and mechanism for oscillating said ring in the reverse direction whereby the wire is disengaged from one of said guides and drawn over the other guide as the means moves around the bundle.

72. A bundle-binding machine comprising an oscillatory ring, a bundle support within said ring, two guides mounted on said ring, a wire twister, and means for oscillating said ring whereby a wire is directed into the twister, around the bundle and back into the twister, said wire being disengaged from one guide and directed by the other as the element moves about the bundle.

73. In combination, means for holding a bundle, a wire twister having a wire holding pin, a wire cutter means to bend the end of the wire over the pin for securely holding the wire, an oscillatory member, a pulley and a guide on said member, mechanism for actuating the oscillatory member whereby the wire is led through the twister around the bundle and back through the twister, the guide turning out of operative position whereby the wire is directed around a portion of the bundle by the pulley, and means for actuating said cutter and said twister.

74. A bundle-binding machine comprising a twister, means for holding one end of the wire in the twister, a ring, means adjacent said ring for supporting a bundle, means for oscillating said ring about its axis through an arc slightly greater than 360 degrees, means on said ring for guiding a wire around a bundle and into the twister, and means for actuating the twister for securing the ends of the wire together.

75. A bundle-binding machine comprising a wire twister, means for holding one end of the wire in said twister, a ring, a bundle holder within said ring, guides carried by said ring, means for oscillating said ring slightly more than 360 degrees, means for supplying wire under tension to said guides, and means for taking up the slack and maintaining the tension on the wire when the ring oscillates.

76. A bundle-binding machine comprising a wire twister, means for holding one end of a wire in said twister, an oscillatory member, means for oscillating said member, a bundle holder adjacent which said member oscillates, guides on said member over which said wire is trained whereby the oscillation of the member wraps the wire on the bundle, means for maintaining tension on the wire, and means to take up the slack due to the oscillation of said member, the last named means comprising pulleys mounted to move toward and away from each other.

77. A bundle-binding machine comprising a twister, pins at each side of the twister around which the wire is bent, and means for moving said pins, to engage or disengage the wire.

78. A bundle-tying machine comprising a support, means to clamp a bundle thereon in two planes, means to adjust the clamping means to hold bundles of different widths and heights, means to place a tie wire around the bundle, means to cut the tie wire, and twisting means to secure the tie-ends together.

79. In a bundle-tying machine, the combination of a support, means to secure a bundle thereon, means to place a tie wire around the bundle, tie wire cutting and tying means operatively mounted in the machine and positioned to receive the wire carried by said wire placing means, means to shift the tied bundle to a second position, and means to thereupon flatten the tie ends against the bundle.

80. In a bundle-tying machine, the combination of a support, means to secure a bundle thereon, an oscillatory ring to carry a tie wire around the bundle; a tie wire twisting means including a means to hold the initial end of the tie wire, means for cutting the tie wire, means for gripping the cut end of the tie wire, and means operable thereafter to actuate the twisting means to twist the tie wire ends together.

81. In a bundle-tying machine, the combination of a bundle-holding mechanism, of a shuttle carrier to bend the tie wire while placing the tie wire completely around the bundle, so that the tie wire will closely fit the sides of the bundle, means to cut said tie wire, regardless of the length required, means to twist the wire ends together, means to shift the bundle to a second position in the machine, and means to thereupon bend the ends of the tie flat against the side of the bundle.

82. In a bundle-tying machine, the combination of an oscillatable annular shuttle carrier within which the bundle is placed to be tied, means to oscillate the shuttle carrier to carry the tie wire around the bundle, means to take up the slack of the tie wire, means to cut off the tie wire, regardless of the girth of the bundle, means to secure the tie ends together, and means to oscillate said shuttle carrier to carry the wire end to the starting position.

83. In a bundle-tying machine, the combination of an annular shuttle carrier within which the bundle to be tied is placed, means to form the end of the tie wire into a hook, means to oscillate the annular shuttle carrier to carry the tie wire around the bundle and to simultaneously therewith convex the tie wire toward the bundle, means to cut the tie wire, means to form the cut end of the tie wire into a hook, and means to twist the two hooked ends of the tie together.

84. In a bundle-tying machine, the combination of an oscillatable shuttle ring, a shuttle on said ring, means thereon to hold the tie wire end therein, means to oscillate the shuttle ring to carry the tie wire around the bundle, means to take up the slack and tension the tie wire as the tie wire is being passed around the bundle, means to cut the tie wire, means to secure the ends of the tie together, means to shift the bundle to a second position, and means to flatten the tie ends against the bundle.

85. In a bundle-tying machine, the combination of a series of straightening rolls to regulate the tie wire tension, a series of take-up rolls to hold the slack of the tie wire, means to hold a bundle, a shuttle carrier, a shuttle to carry the tie wire around the bundle, said shuttle moving through about one turn in each direction, means to sever the tie wire, means to form the cut end of the wire into a hook, and means to twist the ends of the tie together.

86. In a bundle tying machine comprising a rotatably mounted ring for passing a wire around the bundle, means for alternately rotating said ring in opposite directions comprising a motor, a gear continuously driven in one direction thereby, a gear from which the ring is rotated, and means connected with the former gear for rotating the latter gear alternately in opposite directions.

87. In a bundle tying machine, a rotatable ring for passing a wire around a bundle, a source of continuous rotary motion, and means connecting said source of continuous rotary motion to said ring for alternately rotating said ring in opposite directions.

88. A machine of the class described comprising, in combination, a bundle support, wire end gripping means adjacent one side of the support, rotatable bundle-binding means surrounding the support to place a wire about the sides of the bundle successively, to lie in contact with said sides without the aid of wire clamping mechanism holding the wire against the bundle; and wire tensioning means maintaining a substantially uniform tension on the wire.

89. In a tying machine, a ring rotatable about its axis, means for supplying a binding wire to said ring, and means for mounting said ring to allow rotation in opposite directions.

90. In a wire tying machine, a rotatable ring for effecting winding of wire about an object to be bound and tied, means for mounting the ring to allow rotation in reverse directions, and means for maintaining the wire taut when the direction of rotation of the ring is reversed.

91. In a wire tying machine, a rotatable ring for effecting winding of wire about an object to be bound and tied, means for mounting the ring to allow rotation in reverse directions, means for guiding wire along the periphery of said ring, and means for maintaining the wire taut when the direction of rotation of the ring is reversed.

92. In a binding machine, means for clamping a binding wire, means for tensioning the wire, means including a rotatable ring for effecting encircling of the clamped and tensioned wire about an object to be bound, and means on the ring for holding the wire adjacent the periphery thereof, said latter means including a wire lead-off member intermediate the clamping and tensioning means for effecting tight hugging of the wire against the object.

93. A machine of the class described comprising, in combination, a bundle support, a bundle-positioning abutment, means for holding one end of the wire adjacent the abutment-positioned face of the bundle, and a rotary bundle-binding member movable completely around the bundle for laying a wire successively in contact with the faces of the bundle to bind the same.

94. A machine of the class described comprising, in combination, a bundle support, bundle-binding means, wire tying means surrounded by the bundle-binding means, and a bundle positioning abutment to permit placing the bundle close to the tying means and having a passageway for the wire, the parts being constructed and arranged to discharge the tied wire through said passageway.

GUY A. DUNN.
JOHN ELDRIDGE.